United States Patent
Ogasahara et al.

(10) Patent No.: US 12,106,899 B2
(45) Date of Patent: Oct. 1, 2024

(54) MAGNETIC FIELD APPLICATION DEVICE

(71) Applicant: Mitsubishi Electric Corporation, Tokyo (JP)

(72) Inventors: Atsushi Ogasahara, Tokyo (JP); Shun Tonooka, Tokyo (JP); Masaru Shinozaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/283,828

(22) PCT Filed: Apr. 1, 2021

(86) PCT No.: PCT/JP2021/014203
§ 371 (c)(1),
(2) Date: Sep. 25, 2023

(87) PCT Pub. No.: WO2022/208851
PCT Pub. Date: Oct. 6, 2022

(65) Prior Publication Data
US 2024/0274341 A1    Aug. 15, 2024

(51) Int. Cl.
*H01F 7/06* (2006.01)
*F25B 21/00* (2006.01)

(52) U.S. Cl.
CPC ............ *H01F 7/064* (2013.01); *F25B 21/00* (2013.01); *F25B 2321/0022* (2013.01); *F25B 2321/0023* (2013.01)

(58) Field of Classification Search
None
See application file for complete search history.

(56) References Cited

U.S. PATENT DOCUMENTS

2003/0051774 A1\* 3/2003 Saito .................. H01F 1/015
                                                  148/302
2014/0165595 A1\* 6/2014 Zimm ................. F25B 21/00
                                                    62/3.1

(Continued)

FOREIGN PATENT DOCUMENTS

JP    2004-317040 A    11/2004
JP    2010-054069 A     3/2010

(Continued)

OTHER PUBLICATIONS

International Search Report and Written Opinion mailed on May 18, 2021, received for PCT Application PCT/JP2021/014203, filed on Apr. 1, 2021, 11 pages including English Translation.

(Continued)

*Primary Examiner* — Bernard Rojas
(74) *Attorney, Agent, or Firm* — XSENSUS LLP

(57) ABSTRACT

A magnetic field application device applying a magnetic field to a magnetocaloric material includes: a magnetic field generating component; a first yoke connected to both poles of the magnetic field generating component; and a second yoke movably disposed between a first position and a second position. A first closed magnetic circuit formed by the magnetic field generating component and the first yoke passes through a magnetic field application region in which the magnetocaloric material is accommodated. A second closed magnetic circuit formed by the magnetic field generating component, the first yoke, and the second yoke bypasses the magnetic field application region. Magnetic resistance of the second closed magnetic circuit when the second yoke is located at the second position is smaller than the magnetic resistance of the second closed magnetic circuit when the second yoke is located at the first position.

5 Claims, 13 Drawing Sheets

(56) References Cited

U.S. PATENT DOCUMENTS

2016/0025385 A1     1/2016   Auringer et al.
2017/0130999 A1     5/2017   Numazawa
2017/0370624 A1*   12/2017   Zimm ................... F25B 21/00

FOREIGN PATENT DOCUMENTS

| | | | | |
|---|---|---|---|---|
| JP | 2011-080711 A | | 4/2011 | |
| JP | 2017-522532 A | | 8/2017 | |
| JP | 2020046079 A | * | 3/2020 | ............. F25B 21/00 |
| WO | 2015/199139 A1 | | 12/2015 | |

OTHER PUBLICATIONS

Notice of Reason for Refusal mailed on Sep. 21, 2021, received for JP Application 2021-540247, 10 pages including English Translation.

Decision of Refusal mailed on Jan. 4, 2022, received for JP Application 2021-540247, 7 pages including English Translation.

Decision to Grant mailed on Mar. 8, 2022, received for JP Application 2021-540247, 6 pages including English Translation.

* cited by examiner

MAGNETIC FIELD APPLICATION DEVICE

CROSS-REFERENCE TO RELATED APPLICATION

This application is based on PCT filing PCT/JP2021/014203, filed Apr. 1, 2021, the entire contents of which are incorporated herein by reference.

TECHNICAL FIELD

The present disclosure relates to a magnetic field application device.

BACKGROUND ART

In recent years, an active magnetic regenerator (AMR) type magnetic refrigeration device has been developed. The AMR type magnetic refrigeration device includes a magnetic heat bed filled with a magnetocaloric material and a magnetic field application device that applies a magnetic field to the magnetic heat bed. When intensity of the magnetic field applied to the magnetic heat bed is varied, heat generation and heat absorption are generated due to a magnetocaloric effect of the magnetocaloric material. The magnetocaloric effect is a phenomenon, in which the magnetocaloric material generates heat by increasing the intensity of the magnetic field applied to the magnetocaloric material and the magnetocaloric material absorbs heat by decreasing the intensity of the magnetic field applied to the magnetocaloric material.

National Patent Publication No. 2017-522532 (PTL 1) and Japanese Patent Laying-Open No. 2004-317040 (PTL 2) disclose a magnetic field application device that gives a variation in the intensity of the magnetic field applied to the magnetocaloric material. The magnetic field application device disclosed in PTL 1 implements an intensity variation of the magnetic field applied to the magnetocaloric material by carrying the magnetocaloric material into a region to which the magnetic field is applied (hereinafter, the region referred to as "magnetic field application region") and carrying the magnetocaloric material out of the magnetic field application region. The magnetic field application device disclosed in PTL 2 includes an electromagnet, and implements the intensity variation of the magnetic field applied to the magnetocaloric material by excitation and demagnetization of the electromagnet.

CITATION LIST

Patent Literatures

PTL 1: Japanese National Patent Publication No. 2017-522532
PTL 1: Japanese Patent Laying-Open No. 2004-317040

SUMMARY OF INVENTION

Technical Problem

When the intensity variation of the magnetic field applied to the magnetocaloric material is not uniform, the generation of the heat generation and the heat absorption of the magnetocaloric material is nonuniform. As a result, a heat transport efficiency is degraded, and heat loss is generated. In the magnetic field application device disclosed in PTL 1, in order to uniformly vary the intensity of the magnetic field applied to the magnetocaloric material, the entire magnetocaloric material is required to be carried in and out of the magnetic field application region. Accordingly, a moving distance of the magnetocaloric material becomes long, and it is difficult to change the intensity of the magnetic field applied to the magnetocaloric material at high speed.

Even in the magnetic field application device disclosed in PTL 2, it is difficult to vary the intensity of the magnetic field applied to the magnetocaloric material at high speed due to an inductance effect of the electromagnet.

The present disclosure has been made to solve the above problems, and an object of the present disclosure is to provide a magnetic field application device capable of uniformly and rapidly varying the intensity of the magnetic field applied to the magnetocaloric material.

Solution to Problem

A magnetic field application device according to one aspect of the present disclosure applies a magnetic field to a magnetocaloric material. The magnetic field application device includes a magnetic field generating component, a first yoke connected to both poles of the magnetic field generating component, and a second yoke disposed movably between a first position and a second position. A first closed magnetic circuit formed by the magnetic field generating component and the first yoke passes through a magnetic field application region in which the magnetocaloric material is accommodated. A second closed magnetic circuit formed by the magnetic field generating component, the first yoke, and the second yoke bypasses the magnetic field application region. A relative positional relationship among the magnetic field generating component, the first yoke, and the magnetic field application region is constant. Magnetic resistance of the second closed magnetic circuit when the second yoke is located at the second position is smaller than the magnetic resistance of the second closed magnetic circuit when the second yoke is located at the first position.

Advantageous Effects of Invention

According to the present disclosure, the relative positional relationship among the magnetic field generating component, the first yoke, and the magnetic field application region is constant, so that a uniform magnetic field is applied to the magnetocaloric material accommodated in the magnetic field application region. Furthermore, the magnetic resistance of the second closed magnetic circuit varies when the position of the second yoke is moved. Intensity of the magnetic field in the magnetic field application region of the first closed magnetic circuit varies according to the variation in the magnetic resistance of the second closed magnetic circuit. That is, the intensity of the magnetic field applied to the magnetocaloric material can be varied at high speed by moving the position of the second yoke. Thus, the intensity of the magnetic field applied to the magnetocaloric material can be uniformly varied at high speed.

DESCRIPTION OF EMBODIMENTS

Figure 1:
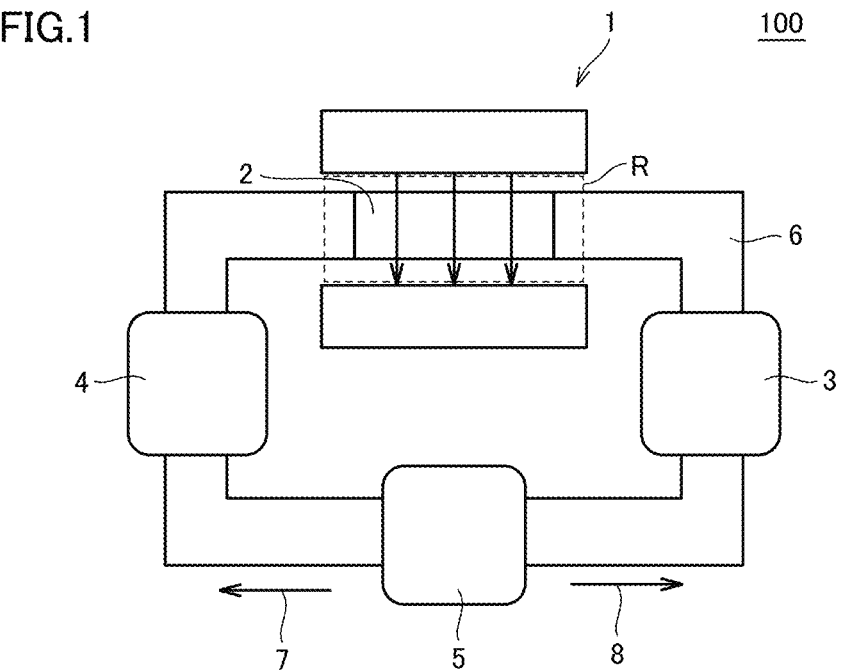
FIG. 1 is a view illustrating an example of a magnetic refrigeration device to which a magnetic field application device according to an embodiment is applied.

With reference to the drawings, an embodiment of the present disclosure will be described in detail below. In the drawings, the same or corresponding part is denoted by the same reference numeral, and the description thereof will not generally be repeated. In the following drawings, a relationship between sizes of components may be different from the actual relationship.

First Embodiment (Outline of Magnetic Refrigeration Device)

FIG. 1 is a view illustrating an example of a magnetic refrigeration device to which a magnetic field application device according to an embodiment is applied. As illustrated in FIG. 1, a magnetic refrigeration device 100 includes a magnetic field application device 1, a magnetic heat bed 2, heat exchangers 3, 4, a pump 5, and a pipe 6.

Magnetic field application device 1 has a magnetic field application region R, and applies a magnetic field to the magnetic field application region. Magnetic field application device 1 can vary intensity of the magnetic field in magnetic field application region R.

Magnetic heat bed 2 contains a magnetocaloric material. Magnetic heat bed 2 is accommodated in magnetic field application region R of magnetic field application device 1. The magnetocaloric material is a material having a magnetocaloric effect, and for example, is a gadolinium metal or a composite metal. For example, the magnetocaloric material has a particle shape, a plate shape, or a pipe shape. In magnetic heat bed 2, the magnetocaloric material is filled to include a gap passing a heat transport medium such as water, an antifreeze liquid, or an ethanol solution.

Pipe 6 connects magnetic heat bed 2, heat exchanger 3, pump 5, and heat exchanger 4 in this order. Pipe 6 is filled with the heat transport medium. This forms a circuit through which the heat transport medium circulates.

Pump 5 pumps the heat transport medium in pipe 6. Pump 5 has a valve (not illustrated) that switches a circulation direction of the heat transport medium to either a forward or reverse direction. That is, pump 5 switches the circulation direction of the heat transport medium to either a forward direction 7 in the order of heat exchanger 4, magnetic heat bed 2, and heat exchanger 3 or a backward direction 8 in the order of heat exchanger 3, magnetic heat bed 2, and heat exchanger 4.

Heat exchangers 3, 4 perform heat exchange between an external environment and the heat transport medium. In the example of FIG. 1, for example, heat exchanger 3 performs the heat exchange between air outside a refrigerator and the heat transport medium. For example, heat exchanger 4 performs the heat exchange between air in the refrigerator and the heat transport medium.

When the intensity of the magnetic field in magnetic field application region R is increased by magnetic field application device 1, the magnetocaloric material in magnetic heat bed 2 generates heat. The heat transport medium in magnetic heat bed 2 perform the heat exchange with the magnetocaloric material. Thus, the heat transport medium is heated. The heated heat transport medium is transported in forward direction 7 by pump 5, subjected to the heat exchange with the outside air in heat exchanger 3, and cooled.

When the heat generated by the magnetocaloric material is released to the outside, the intensity of the magnetic field in magnetic field application region R is weakened by magnetic field application device 1. As a result, the magnetocaloric material is cooled. At this point, pump 5 switches the transport direction of the heat transport medium to backward direction 8. Thus, when flowing through the magnetocaloric material, the heat transport medium performs the heat exchange with the magnetocaloric material and is cooled. The cooled heat transport medium performs the heat exchange with the external environment (for example, air in the refrigerator) in heat exchanger 4. Thus, a temperature of the external environment can be lowered.

(Configuration of Magnetic Field Application Device)

Figure 2:
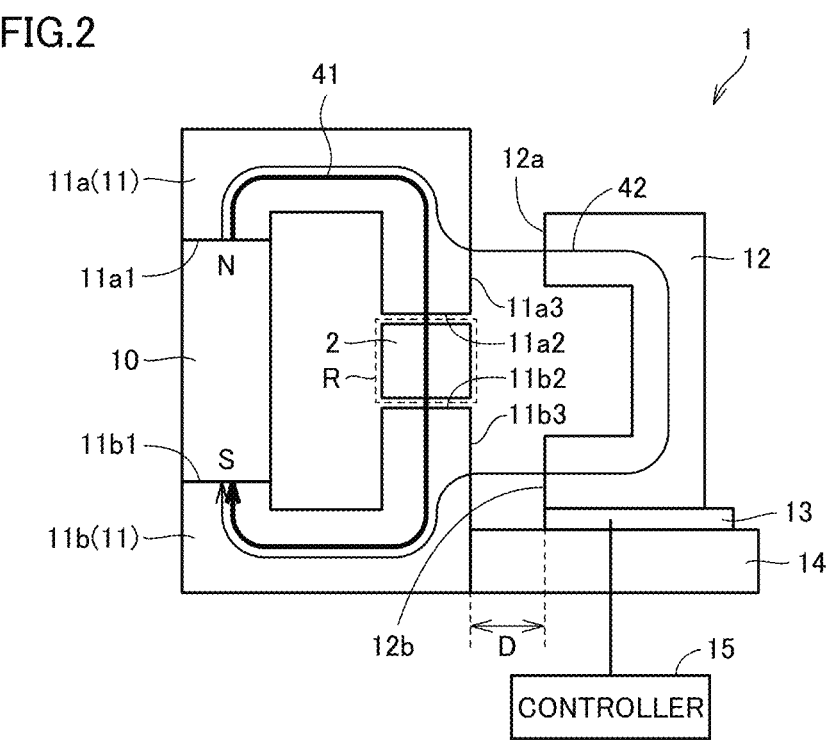
FIG. 2 is a view illustrating a configuration of the magnetic field application device according to a first embodiment when intensity of a magnetic field in a magnetic field application region is increased.
Figure 3:
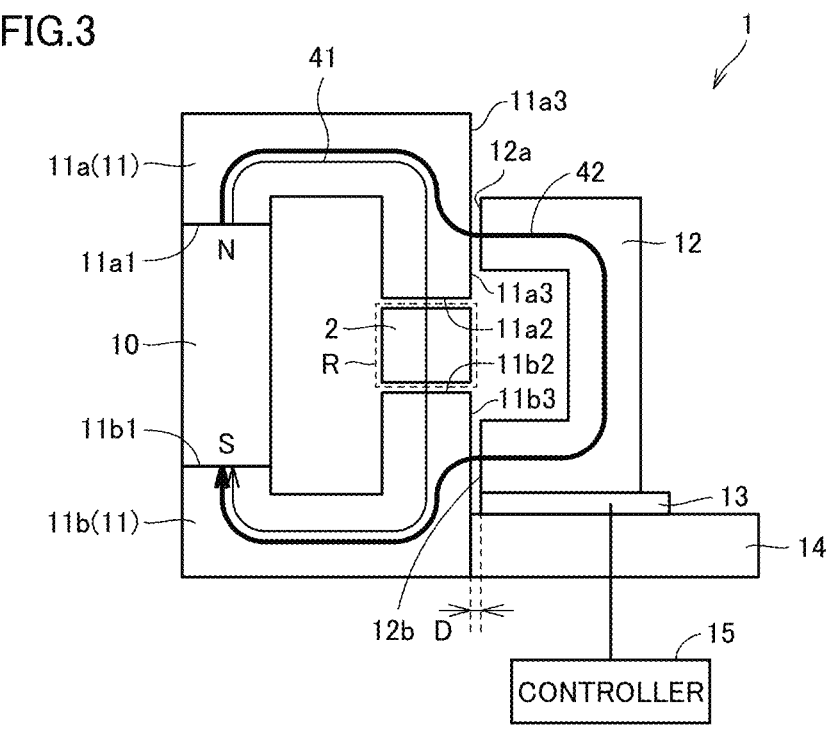
FIG. 3 is a view illustrating the configuration of the magnetic field application device of the first embodiment when the intensity of the magnetic field in the magnetic field application region is weakened.

FIG. 2 is a diagram illustrating a configuration of the magnetic field application device according to a first embodiment when the intensity of the magnetic field in the magnetic field application region is increased. FIG. 3 is a diagram illustrating the configuration of the magnetic field application device of the first embodiment when the intensity of the magnetic field in the magnetic field application region is weakened.

As illustrated in FIGS. 2 and 3, magnetic field application device 1 of the first embodiment includes a magnetic field generating component 10, a first yoke 11, a second yoke 12, an actuator 13, a base 14, and a controller 15. Magnetic field generating component 10 is a permanent magnet.

First yoke 11 is connected to both poles of magnetic field generating component 10. Specifically, first yoke 11 includes two yokes 11a, 11b. Yoke 11a includes an end face 11a1 connected to an N pole of magnetic field generating component 10 and an end face 11a2 opposite to end face 11a1. Because end face 11a1 is connected to the N pole of magnetic field generating component 10, end face 11a1 is an S pole, and end face 11a2 is the N pole. Yoke 11b includes an end face 11b1 connected to the S-pole of magnetic field generating component 10 and an end face 11b2 opposite to end face 11a1. Because end face 11b1 is connected to the S pole of magnetic field generating component 10, end face 11b1 is the N pole, and end face 11b2 is the S pole.

End faces 11a2, 11b2 are opposite to each other. A gap between end face 11a2 and end face 11b2 forms magnetic field application region R. Because end face 11a2 serves as the N pole and end face 11b2 serves as the S pole, the magnetic field is applied to magnetic field application region R. Magnetic heat bed 2 filled with the magnetocaloric material is accommodated in magnetic field application region R. Magnetic heat bed 2 extends in a direction perpendicular to the paper surfaces in FIGS. 2 and 3, and occupies entire magnetic field application region R between end faces 11a2, 11b2.

Magnetic field generating component 10 and first yoke 11 form a first closed magnetic circuit 41. First closed magnetic circuit 41 passes through magnetic field application region R.

In the magnetic field application device disclosed in PTL 1, the magnetocaloric material is carried in and out of the magnetic field application region. For this reason, in order to smoothly perform the carrying in and out, a gap is formed between the magnetic heat bed filled with the magnetocaloric material and the member forming the magnetic field application region. On the other hand, in magnetic field application device 1 of the first embodiment, a relative positional relationship among magnetic field generating component 10, first yoke 11, and magnetic field application region R is constant. Then, magnetic heat bed 2 is accommodated in magnetic field application region R and does not move. Consequently, magnetic heat bed 2 may be in contact with first yoke 11. Thus, magnetic field application region R can be effectively used. In addition, a uniform magnetic field can be applied to the magnetocaloric material filled in magnetic heat bed 2.

Second yoke 12 includes an end face 12a opposite to a side surface 11a3 in the vicinity of magnetic field application region R in yoke 11a and an end face 12b opposite to a side surface 11b3 in the vicinity of magnetic field application region R in yoke 11b. Second yoke 12 has a shape bent from end face 12a toward end face 12b so as to bypass magnetic field application region R. Thus, as illustrated in FIGS. 2 and 3, a second closed magnetic circuit 42 formed by magnetic field generating component 10, first yoke 11, and second yoke 12 bypasses magnetic field application region R.

In the example of FIGS. 2 and 3, a section of second yoke 12 is substantially U-shaped rotated by 90°. The sectional shape of second yoke 12 is not limited to this, but may be an I shape or the like.

Base 14 is disposed so as to have a constant relative position with respect to magnetic field generating component 10 and first yoke 11.

Actuator 13 is installed on base 14. Second yoke 12 is attached to actuator 13. Actuator 13 translates second yoke 12 between a first position and a second position such that a distance D between side surfaces 11a3, 11b3 of first yoke 11 and end faces 12a, 12b of second yoke 12 changes. That is, actuator 13 is a moving mechanism that moves second yoke 12 between the first position and the second position.

FIG. 2 illustrates a state where second yoke 12 is located at the first position. As illustrated in FIG. 2, distance D is the longest when second yoke 12 is located at the first position. Permeability of the gap between side surfaces 11a3, 11b3 of first yoke 11 and end faces 12a, 12b of second yoke 12 is small. For this reason, when second yoke 12 is located at the first position, magnetic resistance of second closed magnetic circuit 42 is larger than magnetic resistance of first closed magnetic circuit 41. As a result, the magnetic field (magnetic force line) generated by magnetic field generating component 10 tends to concentrate on first closed magnetic circuit 41. The intensity of the magnetic field is expressed by the number of magnetic force lines per unit area, namely, the magnetic flux density. Accordingly, the intensity of the magnetic field in magnetic field application region R through which first closed magnetic circuit 41 passes increases when second yoke 12 is located at the first position.

FIG. 3 illustrates a state where second yoke 12 is located at the second position. As illustrated in FIG. 3, distance D is the shortest when second yoke 12 is located at the second position. For this reason, the magnetic resistance of second closed magnetic circuit 42 when second yoke 12 is located at the second position is smaller than the magnetic resistance of second closed magnetic circuit 42 when second yoke 12 is located at the first position. Thus, the magnetic field generated by magnetic field generating component 10 also tends to concentrate on second closed magnetic circuit 42. As a result, the intensity of the magnetic field in magnetic field application region R when second yoke 12 is located at the second position is smaller than the intensity of the magnetic field in magnetic field application region R when second yoke 12 is located at the first position.

The intensity of the magnetic field in magnetic field application region R is weakened when second yoke 12 is moved from the first position to the second position in this manner. Conversely, the intensity of the magnetic field in the magnetic field application region R is strengthened when second yoke 12 is moved from the second position to the first position.

When second yoke 12 is located at the second position, the magnetic resistance of second closed magnetic circuit 42 is preferably smaller than the magnetic resistance of first closed magnetic circuit 41. Thus, the magnetic field generated by magnetic field generating component 10 is more easily concentrated on second closed magnetic circuit 42 bypassing magnetic field application region R. As a result, the difference between the intensity of the magnetic field in magnetic field application region R when second yoke 12 is located at the second position and the intensity of the magnetic field in magnetic field application region R when second yoke 12 is located at the first position becomes larger. That is, an intensity fluctuation of the magnetic field in magnetic field application region R can be increased.

The permeability of the magnetocaloric material is preferably smaller than the permeability of first yoke 11 and second yoke 12. Thus, when second yoke 12 is located at the second position, the magnetic resistance of second closed magnetic circuit 42 can be made smaller than the magnetic resistance of first closed magnetic circuit 41. The magnetic permeability of many known magnetocaloric materials is very small compared to the magnetic permeability of common yokes. For this reason, even when a known magnetocaloric material is used, the magnetic resistance of second closed magnetic circuit 42 can be made smaller than the magnetic resistance of first closed magnetic circuit 41 when second yoke 12 is located at the second position.

Controller 15 controls the operation of actuator 13 to control the intensity of the magnetic field in magnetic field application region R. For example, controller 15 includes a microcomputer, an arithmetic device such as a central processing unit (CPU), software executed on the arithmetic device, and hardware such as a circuit device that implements various functions.

(Control Example of Magnetic Field Intensity)

Figure 4:
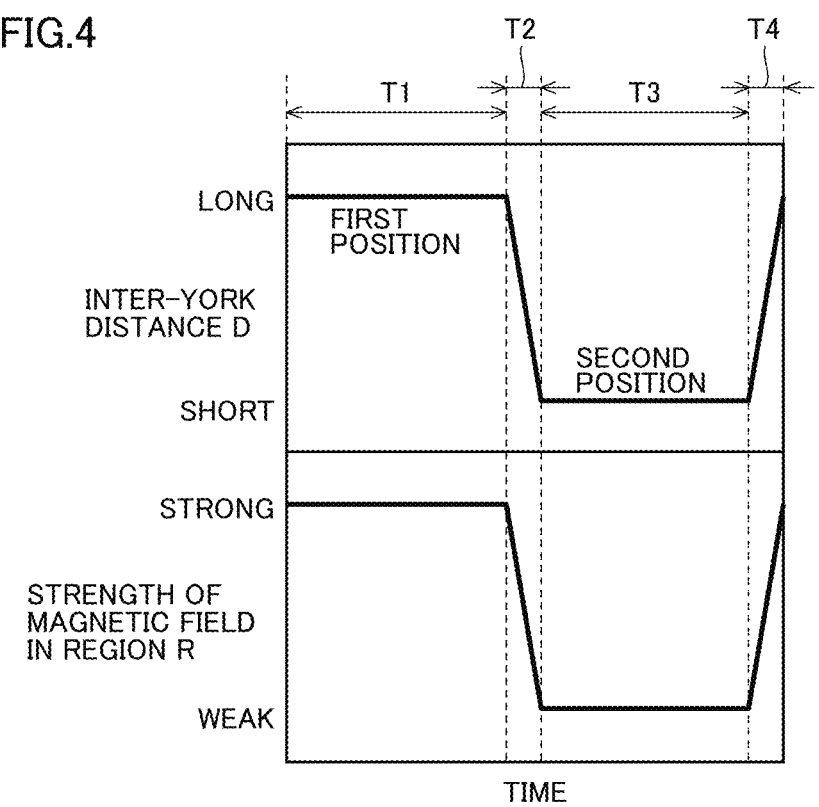
FIG. 4 is a view illustrating a control example of magnetic field intensity in the first embodiment.

FIG. 4 is a view illustrating a control example of magnetic field intensity in the first embodiment. An upper part in FIG. 4 illustrates a graph indicating a temporal change in distance D between first yoke 11 and second yoke 12. A lower part in FIG. 4 illustrates a graph indicating a temporal change in the magnetic field intensity of magnetic field application region R.

In a period T1, controller 15 controls actuator 13 to stagnate second yoke 12 at the first position. Accordingly, distance D between first yoke 11 and second yoke 12 is long, and the intensity of the magnetic field in magnetic field application region R is strong.

In a period T2 subsequent to period T1, controller 15 controls actuator 13 to move second yoke 12 from the first position to the second position. Thus, the intensity of the magnetic field in magnetic field application region R is weakened.

In a period T3 subsequent to period T2, controller 15 controls actuator 13 to stagnate the second yoke at the second position. Thus, the intensity of the magnetic field in magnetic field application region R maintains a weak state.

In a period T4 subsequent to period T3, controller 15 controls actuator 13 to move second yoke 12 from the second position to the first position. Thus, the intensity of the magnetic field in magnetic field application region R becomes strong, and returns to the same state as the start time of period T1.

Controller 15 periodically repeats the operations in periods T1 to T4. Thus, the increase and decrease of the magnetic field intensity applied to the magnetocaloric material can be repeated, and magnetic refrigeration device 100 is implemented.

In magnetic refrigeration device 100, heat generation and heat absorption by the magnetocaloric material are transferred to heat exchangers 3, 4 by the heat transport medium. Accordingly, period T1 during which the strong state of the magnetic field intensity is maintained is set to be greater than or equal to the time required for heat transfer by the heat transport medium. Similarly, period T3 during which the weak state of the magnetic field intensity is maintained is set to be greater than or equal to the time required for the heat transfer by the heat transport medium.

On the other hand, from the viewpoint of improving the cycle speed of the increase and decrease of the magnetic field intensity, periods T2, T4 are set as short as possible within a range in which eddy current heat generation of the magnetocaloric material, first yoke 11 and second yoke 12 due to a high-speed variation of the magnetic field does not become a problem.

The permeability of the gap between first yoke 11 and second yoke 12 is much smaller than those of first yoke 11 and second yoke 12. Accordingly, in periods T2, T4, the magnetic resistance of second closed magnetic circuit 42 greatly increases or decreases due to a minute change in distance D between first yoke 11 and second yoke 12. As a result, the magnetic field intensity of magnetic field application region R can be varied at high speed by the movement of second yoke 12 over a short distance.

As second yoke 12 approaches first yoke 11, the magnetic force acting between first yoke 11 and second yoke 12 increases. Accordingly, the shorter distance D between second yoke 12 located at the second position and first yoke 11, the larger the force required to move second yoke 12 from the second position to the first position. Accordingly, the second position is set within a range necessary and sufficient for variation of the magnetic field intensity in magnetic field application region R. That is, the second position is set so as not to approach first yoke 11 beyond a range required for variation of the magnetic field intensity in magnetic field application region R. Driving force of actuator 13 is set so as to oppose the maximum magnetic force acting between first yoke 11 and second yoke 12.

In the example of FIG. 2, second yoke 12 is disposed such that end face 12a is opposite to side surface 11a3 in the vicinity of magnetic field application region R in yoke 11a, and end face 12b is opposite to side surface 11b3 in the vicinity of magnetic field application region R in yoke 11b. However, second yoke 12 may be disposed such that end face 12a is opposite to a side surface of yoke 11a in the vicinity of magnetic field generating component 10, and end face 12b is opposite to a side surface of yoke 11b in the vicinity of magnetic field generating component 10. Thus, second closed magnetic circuit 42 formed by magnetic field generating component 10, first yoke 11, and second yoke 12 also bypasses magnetic field application region R. However, in this case, as the magnetic resistance of second closed magnetic circuit 42 changes, a portion where the magnetization fluctuates in first yoke 11 increases, so that the magnetic loss of first yoke 11 increases.

Second Embodiment

Figure 5:
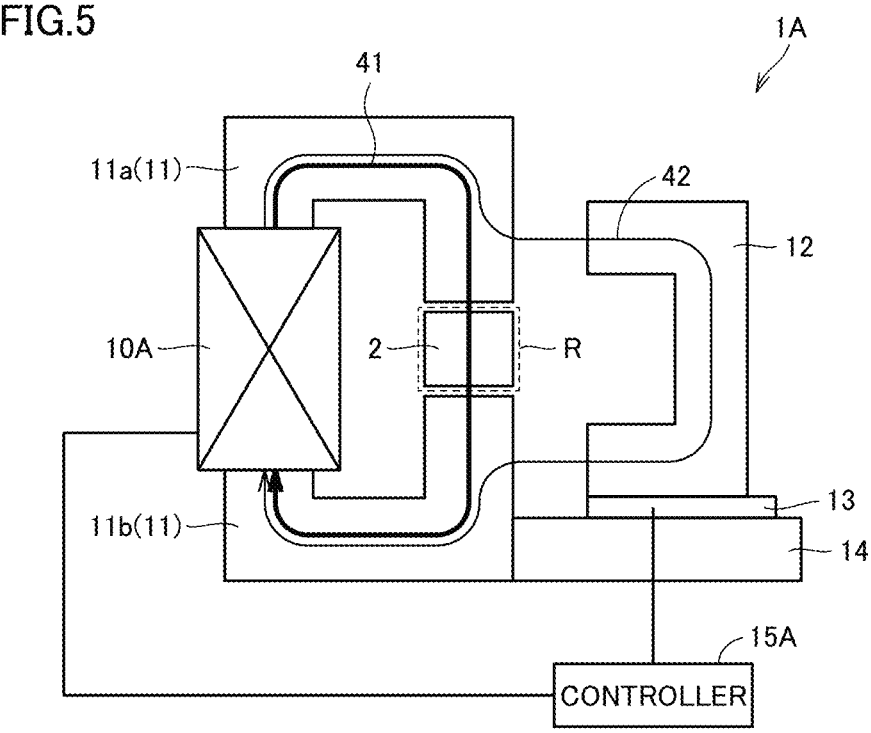
FIG. 5 is a view illustrating a configuration of a magnetic field application device according to a second embodiment when the intensity of the magnetic field in the magnetic field application region is increased.
Figure 6:
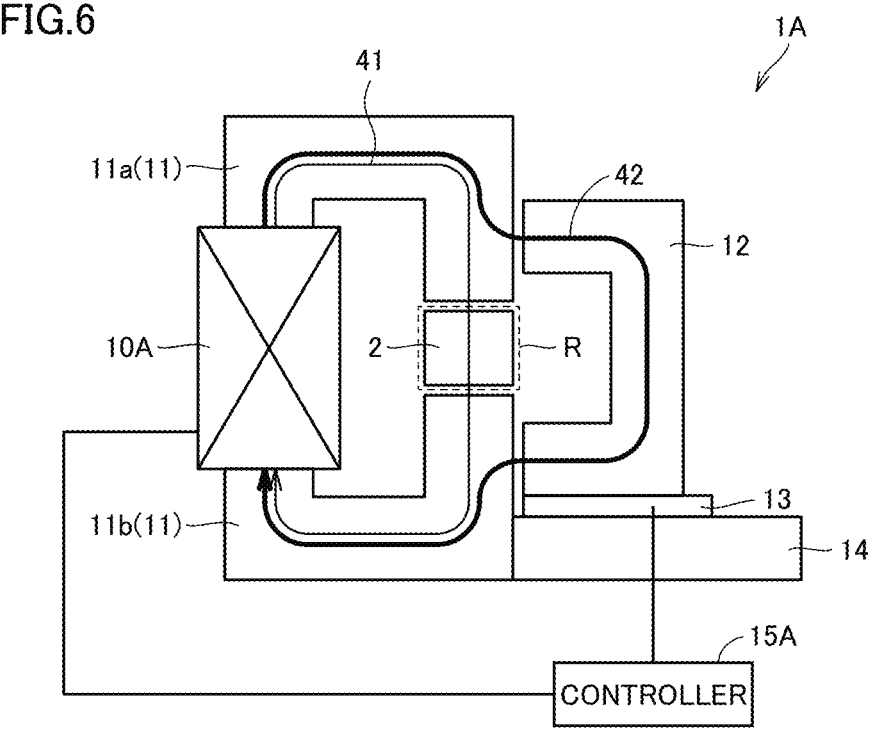
FIG. 6 is a view illustrating the configuration of the magnetic field application device of the second embodiment when the intensity of the magnetic field in the magnetic field application region is weakened.

FIG. 5 is a view illustrating a configuration of the magnetic field application device according to a second embodiment when the intensity of the magnetic field in the magnetic field application region is strengthened. FIG. 6 is a view illustrating the configuration of the magnetic field application device of the second embodiment when the intensity of the magnetic field in the magnetic field application region is weakened.

As illustrated in FIGS. 5 and 6, a magnetic field application device 1A of the second embodiment is different from magnetic field application device 1 of the first embodiment in that magnetic field application device 1A includes a magnetic field generating component 10A and a controller 15A instead of magnetic field generating component 10 and controller 15. Magnetic field generating component 10A is an electromagnet. Controller 15A controls the magnetic force of magnetic field generating component 10A in addition to the control of actuator 13. Specifically, controller 15 controls the current flowing through magnetic field generating component 10A that is the electromagnet.

Figure 7:
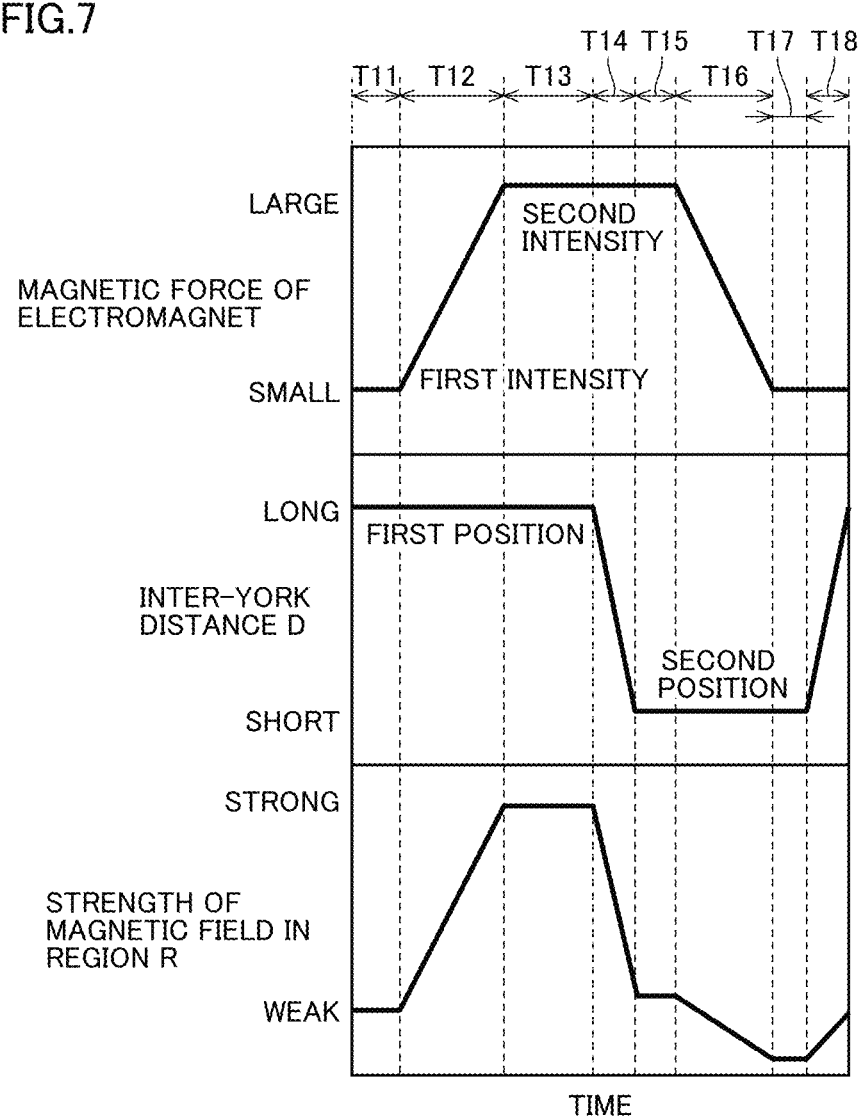
FIG. 7 is a view illustrating a control example of magnetic field intensity in the second embodiment.

FIG. 7 is a view illustrating a control example of the magnetic field intensity in the second embodiment. A first stage in FIG. 7 illustrates a graph indicating a temporal change in the magnetic force of magnetic field generating component 10 that is the electromagnet. A second stage in FIG. 7 illustrates a graph indicating a time change in distance D between first yoke 11 and second yoke 12. A third stage in FIG. 7 illustrates a graph indicating a temporal change in the magnetic field intensity of magnetic field application region R.

In a period T11, controller 15A controls actuator 13 to stagnate second yoke 12 at the first position, and sets the current value of magnetic field generating component 10A to a first specified value such that the magnetic force intensity of magnetic field generating component 10A becomes first intensity. For example, the first specified value is zero or a value slightly larger than zero. Thus, because excitation force of magnetic field generating component 10A is small, the magnetic field intensity of magnetic field application region R is weak.

In a period T12 subsequent to period T11, controller 15A increases the current value of magnetic field generating component 10A from the first specified value to a second specified value while maintaining second yoke 12 at the first position. For example, the second specified value is a maximum value of the current that can be energized to magnetic field generating component 10A. The magnetic force of magnetic field generating component 10A increases to the second intensity by setting the current value of magnetic field generating component 10A to the second specified value. Thus, the magnetic field intensity of magnetic field application region R also increases.

In a period T13 subsequent to period T12, controller 15A maintains the current value of magnetic field generating component 10A at the second specified value while maintaining second yoke 12 at the first position. Thus, the magnetic field intensity of magnetic field application region R maintains a strong state.

In a period T14 subsequent to period T13, controller 15A controls actuator 13 to move second yoke 12 from the first position to the second position while maintaining the current value of magnetic field generating component 10A at the specified value. Thus, the intensity of the magnetic field in magnetic field application region R is weakened.

In a period T15 subsequent to period T14, controller 15A maintains the current value of magnetic field generating component 10A at the second specified value while maintaining second yoke 12 at the second position.

In a period T16 subsequent to period T15, controller 15A reduces the current value of magnetic field generating component 10A from the second specified value to the first specified value while maintaining second yoke 12 at the second position. Thus, the intensity of the magnetic force of magnetic field generating component 10A decreases to the first intensity, and accordingly, the magnetic field intensity of magnetic field application region R is further weakened.

In a period T17 subsequent to period T16, controller 15A maintains the current value of magnetic field generating component 10A at the first specified value while maintaining the second yoke at the second position.

In a period T18 subsequent to period T17, controller 15A controls actuator 13 to move second yoke 12 from the second position to the first position while maintaining the current value of magnetic field generating component 10A at the first specified value. Thus, the magnetic field intensity of magnetic field application region R returns to the same state as that at the start time of period T11.

Controller 15A periodically repeats the operations in periods T11 to T18. Thus, the increase and decrease of the magnetic field intensity applied to the magnetocaloric material can be repeated, and magnetic refrigeration device 100 is implemented.

Because magnetic field generating component 10A is the electromagnet, it is difficult to change the magnetic field intensity of magnetic field application region R at a high speed only by controlling the energization amount to magnetic field generating component 10A due to the inductance effect of the electromagnet. However, according to the second embodiment, when second yoke 12 is moved from the first position to the second position, the magnetic field intensity of magnetic field application region R can be varied at high speed even when period T14 is short.

In periods T13 to T15 in which the current value of magnetic field generating component 10A is maintained at the second specified value and the excitation force of magnetic field generating component 10A is large, the magnetic force between first yoke 11 and second yoke 12 increases. Accordingly, in period T14, second yoke 12 easily moves from the first position to the second position with assistance of the magnetic force.

On the other hand, in periods T17, T18, T11 in which the current value of magnetic field generating component 10A is maintained at the first specified value and the excitation force of magnetic field generating component 10A is small, the magnetic force between first yoke 11 and second yoke 12 becomes small. Accordingly, in period T18, second yoke 12 easily moves from the second position to the first position.

In magnetic refrigeration device 100, heat generation and heat absorption by the magnetocaloric material are transferred to heat exchangers 3, 4 by the heat transport medium. Accordingly, period T13 during which the state of strong magnetic field intensity is maintained is set to be equal to or greater than the time required for heat transfer by the heat transport medium. Similarly, period T17 during which the state of weak magnetic field intensity is maintained is set to be greater than or equal to the time required for heat transfer by the heat transport medium.

In magnetic refrigeration device 100, the periods T11, T12, T14, T15, T16, T17 in which the magnetic field intensity in magnetic field application region R is intermediate are preferably short from the viewpoint of speeding up. In particular, periods T11, T15 are set as short as possible because they are unnecessary for magnetic refrigeration. For example, periods T11, T15 may be set to zero seconds. Furthermore, in order to shorten periods T18, T12, period T11 may be set to zero seconds, and a part of period T18 and a part of period T12 may overlap each other. Similarly, in order to shorten periods T14, T16, period T15 may be set to zero seconds, and a part of period T14 and a part of period T16 may overlap each other. That is, the movement of second yoke 12 and the change in the current value of magnetic field generating component 10A are performed in parallel. However, because the magnetic force between first yoke 11 and second yoke 12 may make it difficult for second yoke 12 to move, the force applied from actuator 13 to second yoke 12 is required to increase.

Third Embodiment

In the first and second embodiments, second yoke 12 is translated by actuator 13. However, the second yoke may be rotationally moved instead of being translationally moved.

Figure 8:
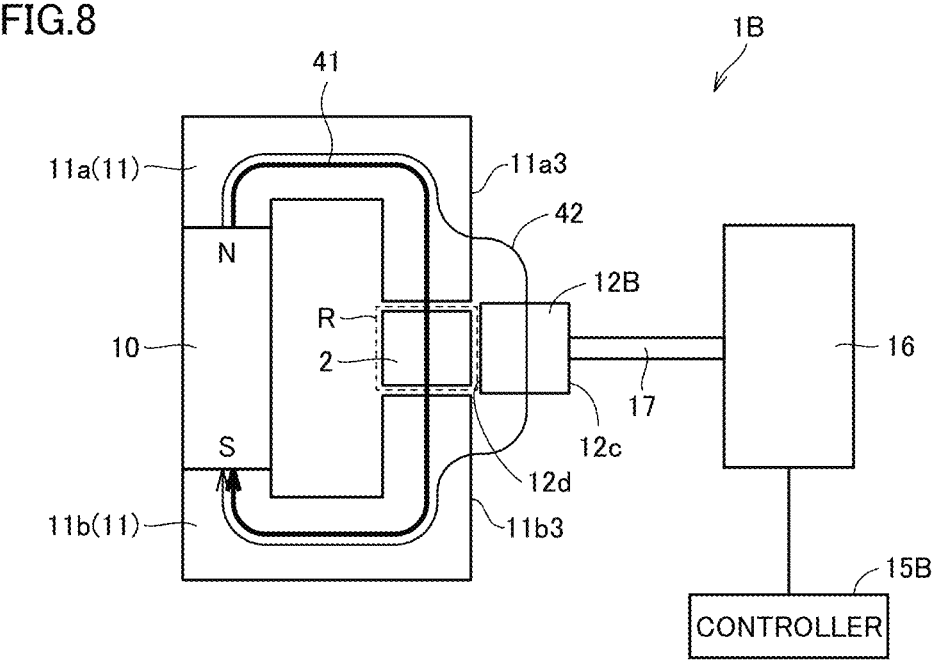
FIG. 8 is a view illustrating a configuration of a magnetic field application device according to a third embodiment when the intensity of the magnetic field in the magnetic field application region is increased.
Figure 9:
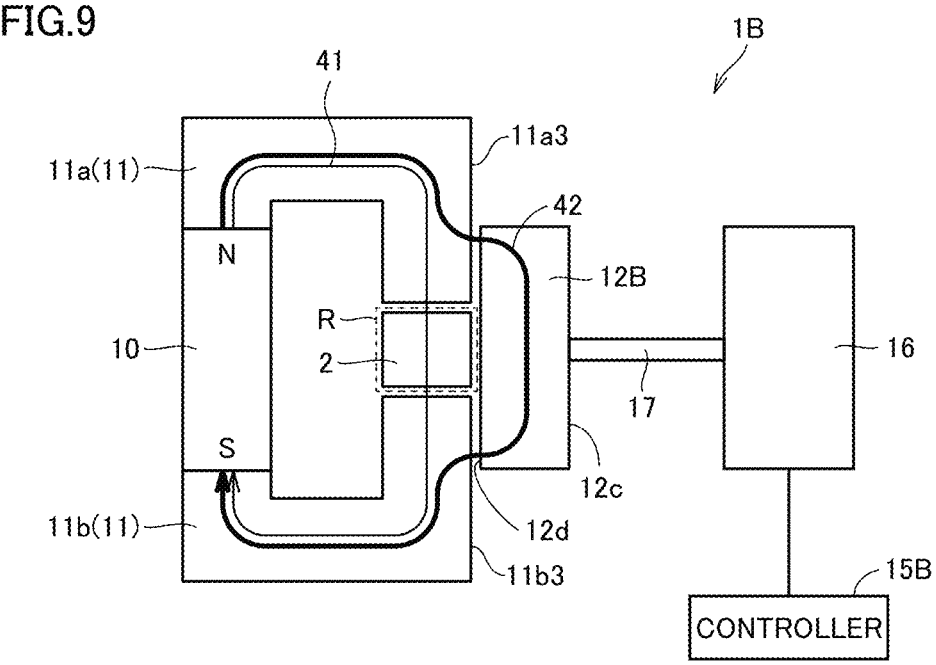
FIG. 9 is a view illustrating the configuration of the magnetic field application device of the third embodiment when the intensity of the magnetic field in the magnetic field application region is weakened.

FIG. 8 is a view illustrating a configuration of the magnetic field application device according to a third embodiment when the intensity of the magnetic field in the magnetic field application region is strengthened. FIG. 9 is a view illustrating the configuration of the magnetic field application device of the third embodiment when the intensity of the magnetic field in the magnetic field application region is weakened.

A magnetic field application device 1B of the third embodiment is different from magnetic field application device 1 of the first embodiment in that magnetic field application device 1B includes a second yoke 12B, a motor 16, a shaft 17, and a controller 15B instead of second yoke 12, actuator 13, base 14, and controller 15. Controller 15B controls the operation of motor 16.

Second yoke 12B has a rectangular parallelepiped shape and is disposed in the vicinity of magnetic field application region R. Accordingly, as illustrated in FIGS. 8 and 9, second closed magnetic circuit 42 formed by magnetic field generating component 10, first yoke 11, and second yoke 12B bypasses magnetic field application region R.

Second yoke 12B is connected to motor 16 with shaft 17 interposed therebetween. Shaft 17 is orthogonal to a side surface 12c along a longitudinal direction of second yoke 12B and is connected to the center of side surface 12c. Shaft 17 extends in the direction orthogonal to side surface 11a3 of yoke 11a in the vicinity of magnetic field application region R and side surface 11b3 of yoke 11b in the vicinity of magnetic field application region R. A side surface 12d on the back side of side surface 12c of second yoke 12B is parallel to side surfaces 11a3, 11b3 of first yoke 11. Second yoke 12B rotationally moves along side surfaces 11a3, 11b3 about shaft 17 according to the rotational force of motor 16. That is, motor 16 and shaft 17 are the moving mechanism that moves second yoke 12 between the first position and the second position.

FIG. 8 illustrates a state where second yoke 12B is located at the first position. As illustrated in FIG. 8, when second yoke 12B is located at the first position, the overlapping area between side surface 12d of second yoke 12B and side surface 11a3 of yoke 11a and side surface 11b3 of yoke 11b is smallest. Specifically, second yoke 12B is disposed such that the longitudinal direction of second yoke 12B is parallel to the longitudinal direction of magnetic heat bed 2. Side surface 12d is not opposite to side surfaces 11a3, 11b3.

FIG. 9 illustrates a state where second yoke 12B is located at the second position. As illustrated in FIG. 9, when second yoke 12B is located at the second position, the overlapping area between side surface 12d of second yoke 12B and side surfaces 11a3, 11b3 of first yoke 11 is the largest. Specifically, second yoke 12B is disposed such that the longitudinal direction of second yoke 12B is orthogonal to the longitudinal direction of magnetic heat bed 2. Side surface 12d is opposite to side surfaces 11a3, 11b3.

The magnetic resistance of second closed magnetic circuit 42 when second yoke 12B is located at the second position is smaller than the magnetic resistance of second closed magnetic circuit 42 when second yoke 12B is located at the first position. Thus, the magnetic field generated by magnetic field generating component 10 also tends to concentrate on second closed magnetic circuit 42. As a result, the intensity of the magnetic field in magnetic field application region R when second yoke 12B is located at the second position is weaker than the intensity of the magnetic field in magnetic field application region R when second yoke 12B is located at the first position.

The distance between side surface 12d and side surfaces 11a3, 11b3 when second yoke 12B is located at the second position is designed to such an extent that second yoke 12B can be rotated and achieve sufficiently low magnetic resistance.

As described above, shaft 17 is connected to the center of side surface 12c of second yoke 12B. For this reason, second yoke 12B is line-symmetric with respect to shaft 17. Furthermore, first yoke 11 may be disposed to be line-symmetric with respect to shaft 17. Thus, the rotation direction of second yoke 12B may be either left rotation or right rotation. That is, the rotational movement from the first position to the second position may be either the right rotation or the left rotation, and the rotational movement from the second position to the first position may be either the right rotation or the left rotation. For this reason, in the operation of repeating the increase and decrease of the magnetic field intensity of magnetic field application region R, controller 15B may cause motor 16 to perform a reciprocating rotation operation or a unidirectional rotation operation.

Similarly to the first embodiment, controller 15B periodically repeats the operations in periods T1 to T4 (see FIG. 4). Thus, the increase and decrease of the magnetic field intensity applied to the magnetocaloric material can be repeated, and magnetic refrigeration device 100 is implemented.

In period T1, controller 15B stops the operation of motor 16 and stagnates second yoke 12B at the first position. In period T2, controller 15B drives motor 16 to rotationally move second yoke 12B from the first position to the second position. In period T3, controller 15B stops the operation of motor 16 and stagnates second yoke 12B at the second position. In period T4, controller 15B drives motor 16 to rotationally move second yoke 12B from the second position to the first position.

While second yoke 12B rotationally moves from the first position to the second position, the opposing surfaces of second yoke 12B and first yoke 11 gradually increase. When first yoke 11 and second yoke 12B start to be opposite to each other, the magnetic resistance of second closed magnetic circuit 42 sharply decreases. However, because the yoke generally involves magnetic saturation, second yoke 12B is magnetically saturated immediately after the start of the rotational movement, and the decrease in the magnetic field intensity in magnetic field application region R is limited. As a result, the magnetic field intensity of magnetic field application region R gradually decreases until the magnetic saturation of second yoke 12B settles while second yoke 12B moves to the second position.

Fourth Embodiment

Figure 10:
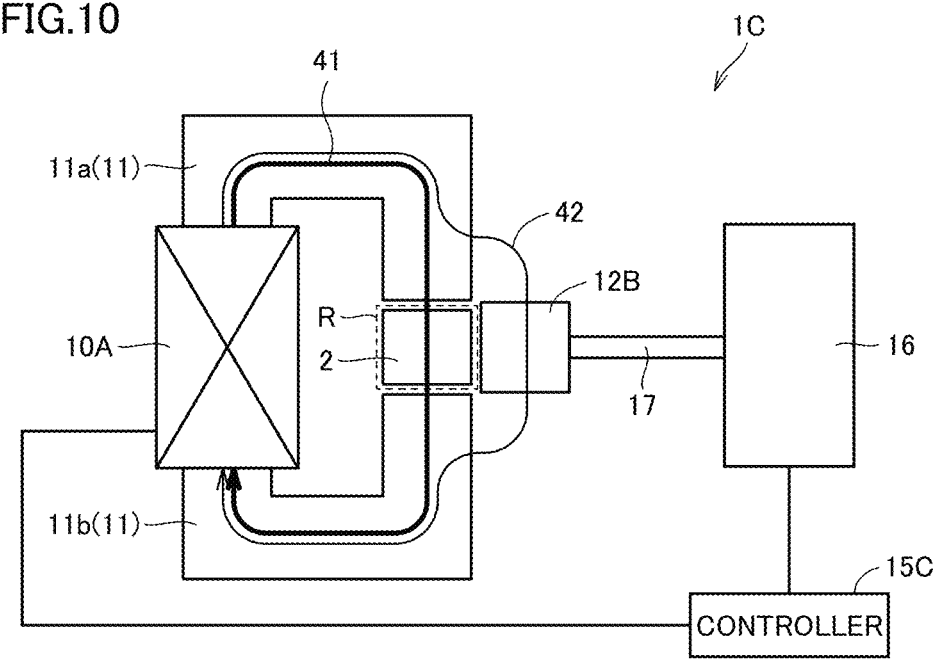
FIG. 10 is a view illustrating a configuration of a magnetic field application device according to a fourth embodiment when the intensity of the magnetic field in the magnetic field application region is increased.
Figure 11:
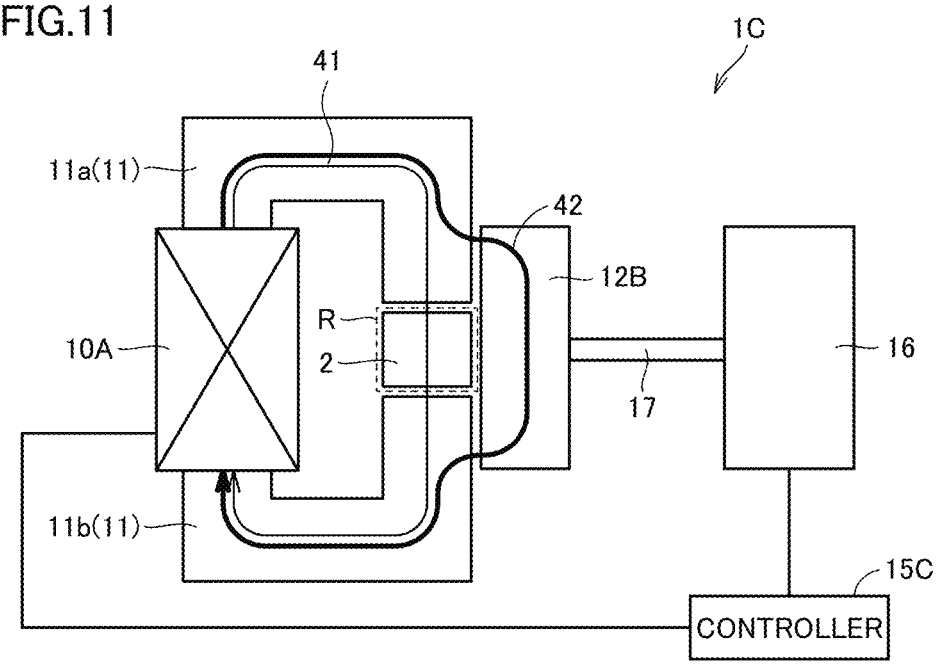
FIG. 11 is a view illustrating the configuration of the magnetic field application device of the fourth embodiment when the intensity of the magnetic field in the magnetic field application region is weakened.

FIG. 10 is a view illustrating a configuration of a magnetic field application device according to a fourth embodiment when the intensity of the magnetic field in the magnetic field application region is increased. FIG. 11 is a view illustrating the configuration of the magnetic field application device of the fourth embodiment when the intensity of the magnetic field in the magnetic field application region is weakened. Similarly to FIG. 8, FIG. 10 illustrates the state where second yoke 12B is located at the first position. Similarly to FIG. 9, FIG. 11 illustrates the state where second yoke 12B is located at the second position.

As illustrated in FIGS. 10 and 11, a magnetic field application device 1C of the fourth embodiment is different from magnetic field application device 1B of the third embodiment in that magnetic field application device 1C includes magnetic field generating component 10A and a controller 15C instead of magnetic field generating component 10 and controller 15B. Magnetic field generating component 10A is an electromagnet. Controller 15C controls the magnetic force of magnetic field generating component 10A in addition to the control of motor 16. Specifically, controller 15C controls the current flowing through magnetic field generating component 10A that is the electromagnet.

Even in magnetic field application device 1C of the fourth embodiment, similarly to the third embodiment, the intensity of the magnetic field in magnetic field application region R is weakened by rotationally moving second yoke 12B from the first position to the second position. Furthermore, the intensity of magnetic field in the magnetic field application region R is increased by rotationally moving the second yoke 12B from the second position to the first position.

Similarly to the second embodiment, controller 15C may periodically repeat the operations in periods T11 to T18 (see FIG. 7). Thus, the increase and decrease of the magnetic field intensity applied to the magnetocaloric material can be repeated, and magnetic refrigeration device 100 is implemented. However, controller 15C controls motor 16 to rotationally move second yoke 12.

Fifth Embodiment

Magnetic field application device 1A of the second embodiment moves second yoke 12 from the first position to the second position using actuator 13. However, the magnetic field application device may omit actuator 13 and move second yoke 12 from the first position to the second position using the magnetic force between first yoke 11 and second yoke 12.

Figure 12:
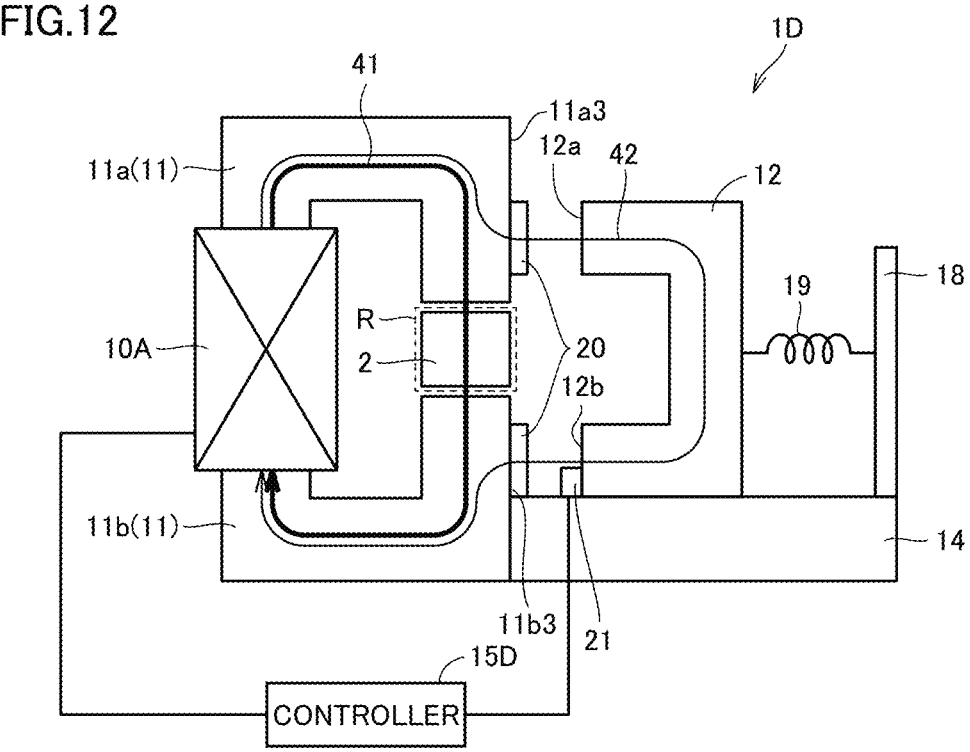
FIG. 12 is a view illustrating a configuration of a magnetic field application device according to a fifth embodiment when the intensity of the magnetic field in the magnetic field application region is increased.
Figure 13:
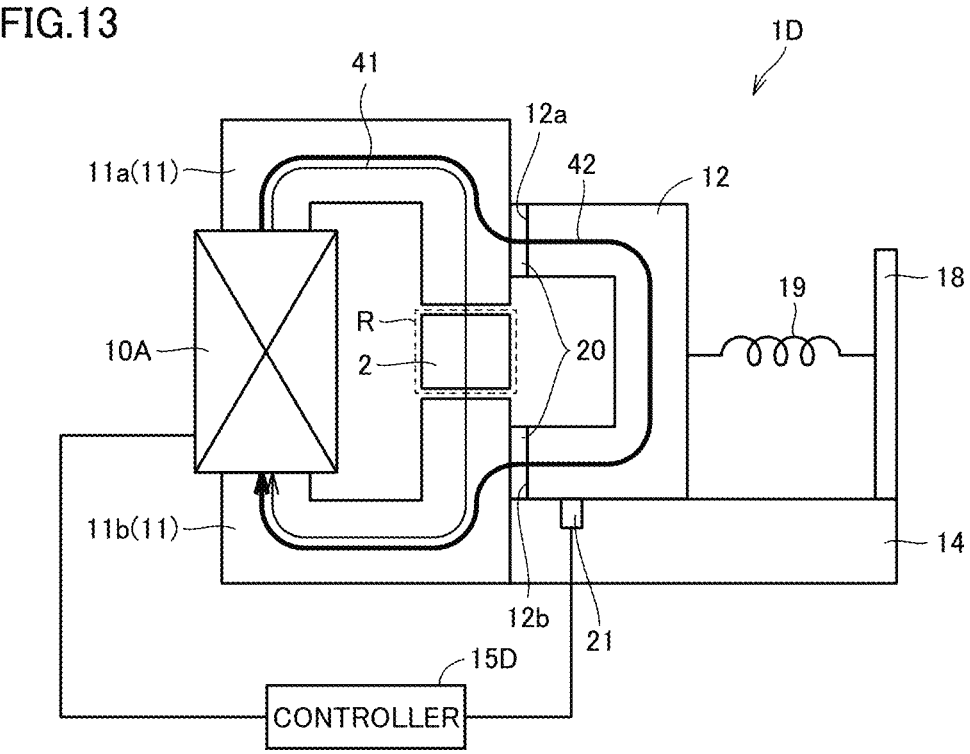
FIG. 13 is a view illustrating the configuration of the magnetic field application device of the fifth embodiment when the intensity of the magnetic field in the magnetic field application region is weakened.

FIG. 12 is a view illustrating a configuration of a magnetic field application device according to a fifth embodiment when the intensity of the magnetic field in the magnetic field application region is increased. FIG. 13 is a view illustrating the configuration of the magnetic field application device of the fifth embodiment when the intensity of the magnetic field in the magnetic field application region is weakened. Similarly to FIG. 5, FIG. 12 illustrates the state where second yoke 12 is located at the first position. Similarly to FIG. 6, FIG. 13 illustrates the state where second yoke 12 is located at the second position.

A magnetic field application device 1D of the fifth embodiment is different from magnetic field application device 1A of the second embodiment in that magnetic field application device 1D includes a fixing member 18, an elastic body 19, a spacer 20, a movable claw 21, and a controller 15D instead of actuator 13 and controller 15A.

Fixing member 18 is fixed to base 14. Consequently, the relative positional relationship between first yoke 11 and fixing member 18 is constant. Fixing member 18 is disposed on the opposite side of first yoke 11 with respect to second yoke 12.

For example, elastic body 19 is a coil spring, and is connected to fixing member 18 and second yoke 12. When second yoke 12 is located at the first position, elastic body 19 is attached with a natural length or slightly longer than the natural length.

Spacer 20 is attached to a portion of side surfaces 11$a$3, 11$b$3 of first yoke 11 opposite to end faces 12$a$, 12$b$ of second yoke 12. For example, spacer 20 is formed of a cushioning material such as rubber. Spacer 20 is in contact with end faces 12$a$, 12$b$ of second yoke 12 located at the second position. When spacer 20 is provided, the magnetic force between first yoke 11 and second yoke 12 can be prevented from becoming too large.

Movable claw 21 is installed on base 14. Movable claw 21 can take a first state of protruding from the upper surface of base 14 and a second state of not protruding from the upper surface of base 14. Movable claw 21 is disposed so as to be in contact with end face 12$b$ of second yoke 12 located at the first position in the first state. For example, movable claw 21 is switched between the first state and the second state by an actuator (not illustrated). Alternatively, a spring (not illustrated) constantly applies force to movable claw 21 in the direction protruding from the upper surface of base 14. Movable claw 21 receives force switching from the first state to the second state when the actuator (not illustrated) operates.

Controller 15D performs control to switch the state of movable claw 21 and controls the magnetic force of magnetic field generating component 10A that is the electromagnet.

Controller 15D may periodically repeat the operations in periods T11 to T16 and T18 (see FIG. 7) in FIG. 7. In the fifth embodiment, the operation in period T17 is omitted. Thus, the increase and decrease of the magnetic field intensity applied to the magnetocaloric material can be repeated, and magnetic refrigeration device 100 is implemented.

However, controller 15D maintains movable claw 21 in the first state (state of protruding from the upper surface of base 14) in periods T11 to T13. Thus, second yoke 12 cannot move to the second position by movable claw 21 even when receiving the magnetic force with respect to first yoke 11.

In period T14, the current value of magnetic field generating component 10A is controlled to a second predetermined value (for example, the maximum value). Accordingly, the magnetic force between first yoke 11 and second yoke 12 is maximized. In period T14, controller 15D switches movable claw 21 to the second state (the state in which movable claw 21 does not protrude from the upper surface of base 14). Because the movement of second yoke 12 is not limited by movable claw 21, the second yoke 12 moves toward first yoke 11 according to the magnetic force, collides with spacer 20, and stops. In this manner, second yoke 12 moves to the second position. Spacer 20 is formed of a cushioning material, so that damage to first yoke 11 and second yoke 12 at the time of the collision can be prevented.

At the end of period T14, elastic body 19 is in an extended state and applies force toward fixing member 18 to second yoke 12. However, the current value (=second specified value) flowing through magnetic field generating component 10A is set such that the magnetic force between second yoke 12 located at the second position and first yoke 11 is larger than the force applied from elastic body 19 to second yoke 12. Accordingly, while the current value of magnetic field generating component 10A is maintained at the second specified value, second yoke 12 stagnates at the second position.

In period T16, controller 15D decreases the current value of magnetic field generating component 10A from the second specified value to the first specified value. When the current value of magnetic field generating component 10A reaches the first specified value at the end of period T16, the force applied from elastic body 19 to second yoke 12 becomes larger than the magnetic force between second yoke 12 and first yoke 11. Thus, second yoke 12 moves to the first position according to the force of elastic body 19. As a result, the magnetic field intensity of magnetic field application region R returns to the same state as that at the start of period T11.

When second yoke 12 moves to the first position, movable claw 21 protrudes from the upper surface of base 14. As a result, movable claw 21 restricts the movement of second yoke 12 toward first yoke 11.

Sixth Embodiment

Figure 14:
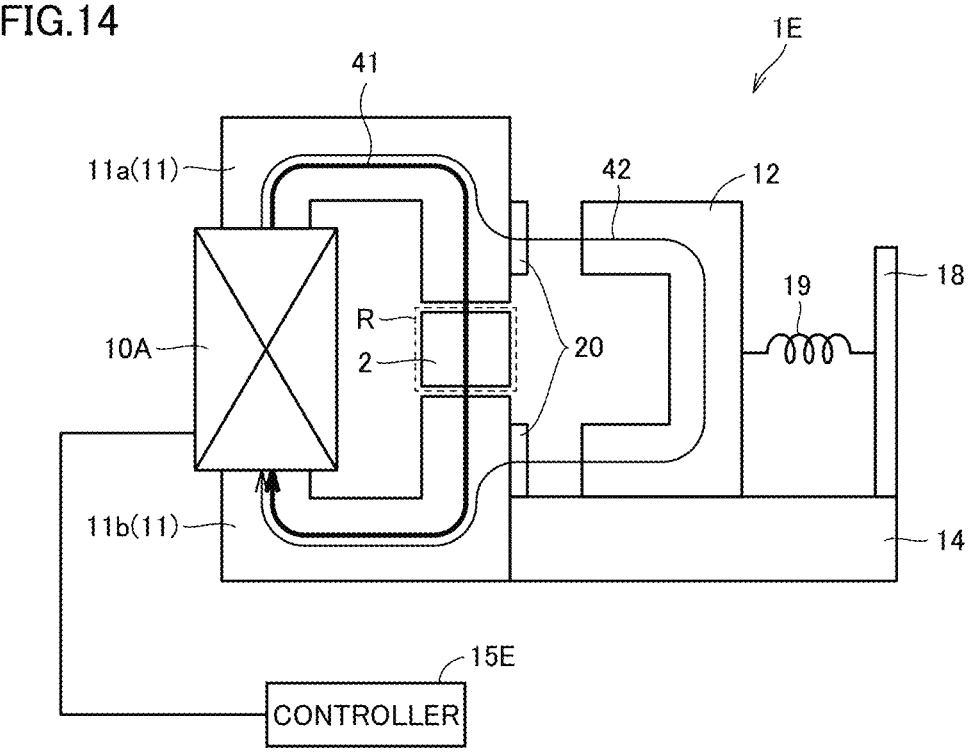
FIG. 14 is a view illustrating a configuration of a magnetic field application device according to a sixth embodiment when the intensity of the magnetic field in the magnetic field application region is increased.
Figure 15:
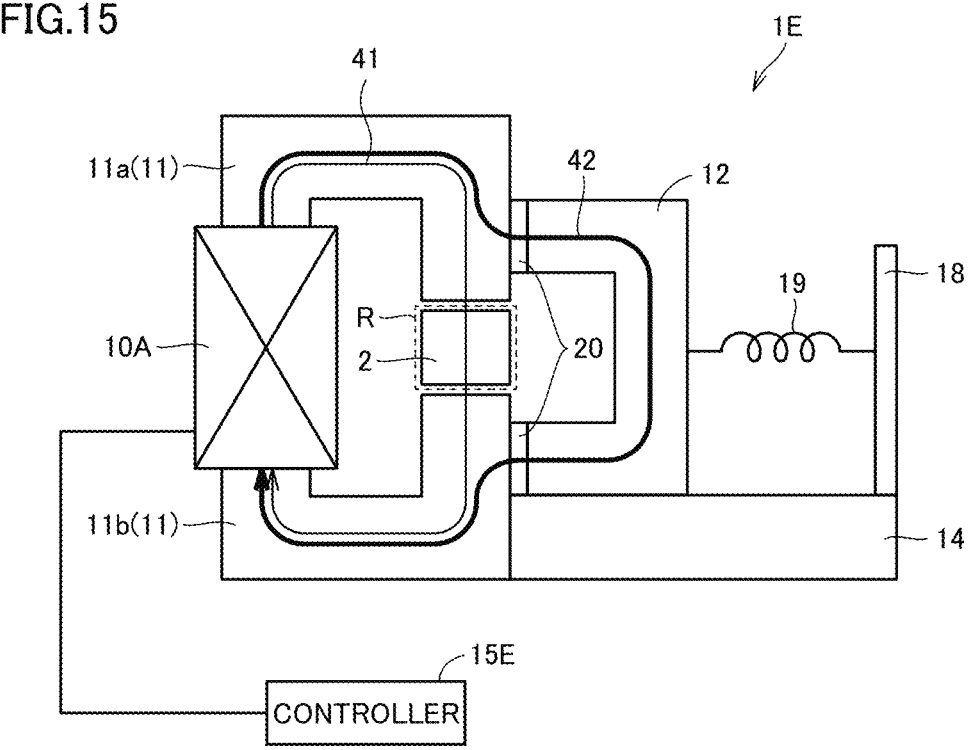
FIG. 15 is a view illustrating the configuration of the magnetic field application device of the sixth embodiment when the intensity of the magnetic field in the magnetic field application region is weakened.

FIG. 14 is a view illustrating a configuration of a magnetic field application device according to a sixth embodiment when the intensity of the magnetic field in the magnetic field application region is increased. FIG. 15 is a view illustrating the configuration of the magnetic field application device of the sixth embodiment when the intensity of the magnetic field in the magnetic field application region is weakened. Similarly to FIG. 12, FIG. 14 illustrates the state where second yoke 12 is located at the first position. Similarly to FIG. 13, FIG. 15 illustrates the state where second yoke 12 is located at the second position.

A magnetic field application device 1E of the sixth embodiment is different from magnetic field application device 1D of the fifth embodiment in that magnetic field application device 1E includes a controller 15E instead of controller 15D and in that movable claw 21 is omitted. Similarly to the second embodiment, controller 15E controls the magnetic force of magnetic field generating component 10A that is the electromagnet.

Figure 16:
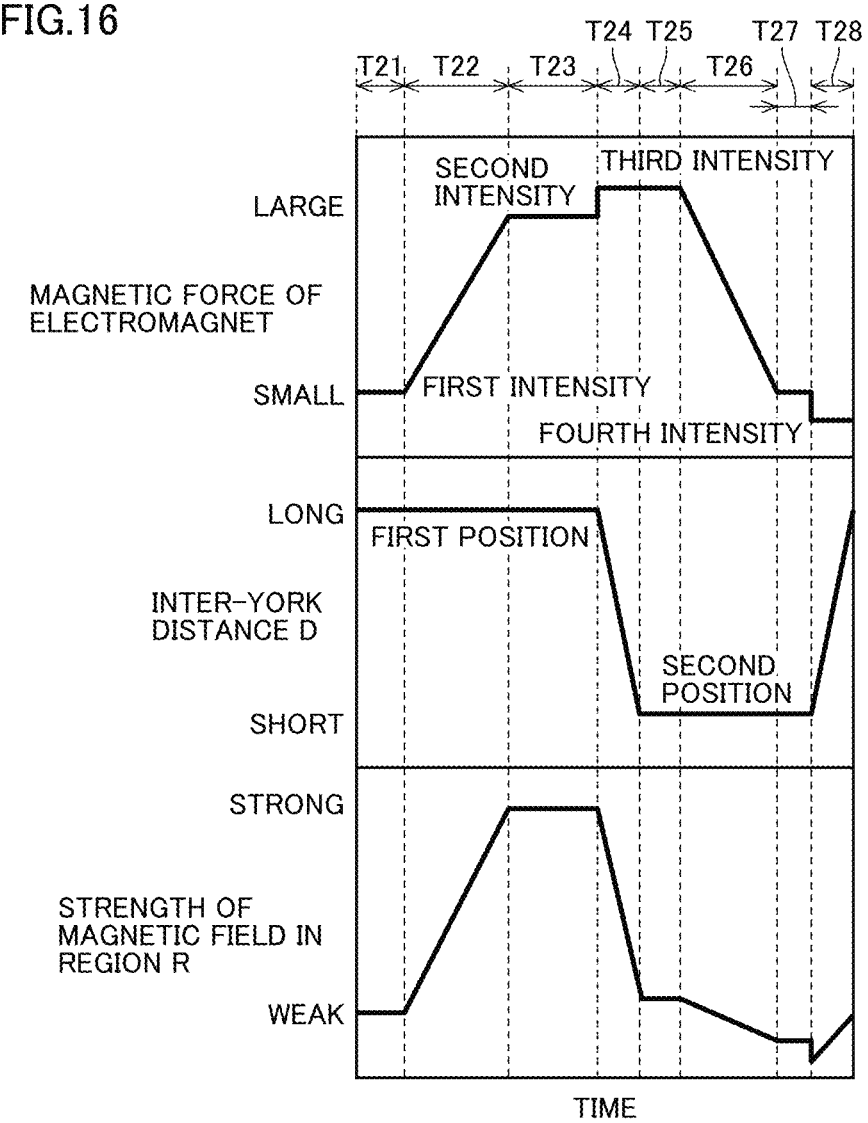
FIG. 16 is a view illustrating a control example of magnetic field intensity in the sixth embodiment.

FIG. 16 is a view illustrating a control example of the magnetic field intensity in the sixth embodiment. The first stage in FIG. 16 illustrates a graph indicating a temporal change in the magnetic force of magnetic field generating component 10A that is the electromagnet. The second stage in FIG. 16 illustrates a graph illustrating a time change in distance D between first yoke 11 and second yoke 12. The third stage in FIG. 16 illustrates a graph indicating a temporal change in the magnetic field intensity of magnetic field application region R.

In a period T21, controller 15E sets the current value of magnetic field generating component 10A to the first specified value such that the magnetic force intensity of magnetic field generating component 10A becomes the first intensity. In the sixth embodiment, the first specified value may be a value slightly larger than zero. Thus, the excitation force of magnetic field generating component 10A is small. Accordingly, the magnetic force between first yoke 11 and second yoke 12 is smaller than the force required to move second yoke 12. Accordingly, second yoke 12 is located at the first position. The force required to move second yoke 12 is greater than or equal to a sum of the force applied from elastic body 19 to second yoke 12 and static frictional force between second yoke 12 and base 14. Furthermore, because the magnetic resistance of second closed magnetic circuit 42 is large, the magnetic field intensity of magnetic field application region R is weak.

In a period T22 subsequent to the period T21, controller 15E increases the current value of magnetic field generating component 10A from the first specified value to the second specified value. In the sixth embodiment, the second predetermined value is set to a value larger than the first specified value and is smaller than the maximum current value that can flow in magnetic field generating component 10A. The magnetic force of magnetic field generating component 10A increases to the second intensity by setting the current value of magnetic field generating component 10A to the second specified value. Thus, the excitation force of magnetic field generating component 10A increases, and the magnetic field intensity of magnetic field application region R also increases. However, the second specified value is set such that the magnetic force between second yoke 12 located at the first position and first yoke 11 is smaller than the force required to move second yoke 12. Accordingly, second yoke 12 stagnates at the first position.

In a period T23 subsequent to period T22, controller 15E maintains the current value of magnetic field generating component 10A at the second specified value. Thus, the magnetic field intensity of magnetic field application region R maintains a strong state. Furthermore, second yoke 12 stagnates at the first position.

In a period T24 subsequent to period T23, controller 15E increases the current value of magnetic field generating component 10A from the second specified value to the third specified value. A third predetermined value is set such that the magnetic force between second yoke 12 located at the first position and first yoke 11 is greater than or equal to the force required to move second yoke 12. For example, the third predetermined value is set to a maximum current value that can flow through magnetic field generating component 10A or a value slightly smaller than the maximum current value. The magnetic force of magnetic field generating component 10A further increases to the third intensity by setting the current value of magnetic field generating component 10A to the third specified value. Thus, second yoke 12 starts to move toward first yoke 11 according to the magnetic force with respect to first yoke 11. As distance D between first yoke 11 and second yoke 12 decreases, the magnetic force between first yoke 11 and second yoke 12 increases, and second yoke 12 moves at a higher speed. Then, second yoke 12 moves to the second position, collides with spacer 20, and stops. Thus, the magnetic resistance of second closed magnetic circuit 42 decreases, and the magnetic field generated by magnetic field generating component 10A is also concentrated on second closed magnetic circuit 42. As a result, the intensity of the magnetic field of magnetic field application region R is weakened.

In a period T25 subsequent to period T24, controller 15E maintains the current value of magnetic field generating component 10A at the third specified value.

In a period T26 subsequent to period T25, controller 15E decreases the current value of magnetic field generating component 10A from the third specified value to the first specified value. Thus, the magnetic force of magnetic field generating component 10A returns to the first intensity, and the magnetic field intensity of magnetic field application region R is further weakened. In the sixth embodiment, the first specified value is set such that the force applied from elastic body 19 to second yoke 12 located at the second position is smaller than the force required to move second yoke 12 to the first position. The force required to move second yoke 12 to the first position is the sum of the magnetic force between second yoke 12 located at the second position and first yoke 11 and the static frictional force between second yoke 12 and base 14. Accordingly, second yoke 12 stagnates at the second position.

In a period T27 subsequent to period T26, controller 15E maintains the current value of magnetic field generating component 10A at the first specified value.

In a period T28 subsequent to period T27, controller 15E decreases the current value of magnetic field generating component 10A from the first specified value to a fourth specified value. The fourth specified value is set such that the force applied from elastic body 19 to second yoke 12 located at the second position is greater than or equal to the force required to move second yoke 12 to the first position. When the current value of magnetic field generating component 10A is set to the fourth specified value, the magnetic force of magnetic field generating component 10A further decreases to the fourth intensity. Accordingly, second yoke 12 starts to move toward the first position according to the force applied from elastic body 19. As distance D between first yoke 11 and second yoke 12 increases, the magnetic force between first yoke 11 and second yoke 12 decreases, and second yoke 12 moves to the first position at a higher speed. When second yoke 12 moves to the first position, the magnetic field intensity of magnetic field application region R returns to the same state as the start time of period T21.

In the sixth embodiment, as illustrated in FIG. 16, in period T23 in which the magnetic field intensity of magnetic field application region R is maximized, the magnetic force of magnetic field generating component 10A is maintained at the second intensity lower than the third intensity. This is because second yoke 12 moves to the second position when the magnetic force of magnetic field generating component 10A is increased to the third intensity. On the other hand, in the fifth embodiment, because the movement of second yoke 12 is restricted by movable claw 21, the magnetic force of magnetic field generating component 10A can be increased to the third intensity while second yoke 12 is maintained at the first position. For this reason, when the electromagnet having the same capacity is used as magnetic field generating component 10A, the maximum value of the magnetic field intensity of magnetic field application region R is larger in the fifth embodiment than in the sixth embodiment. In the sixth embodiment, the maximum value of the magnetic field intensity of magnetic field application region R can be increased by increasing distance D between second yoke 12 and first yoke 11 at the first position and using the electromagnet having a large capacity as magnetic field generating component 10A.

Seventh Embodiment

Figure 17:
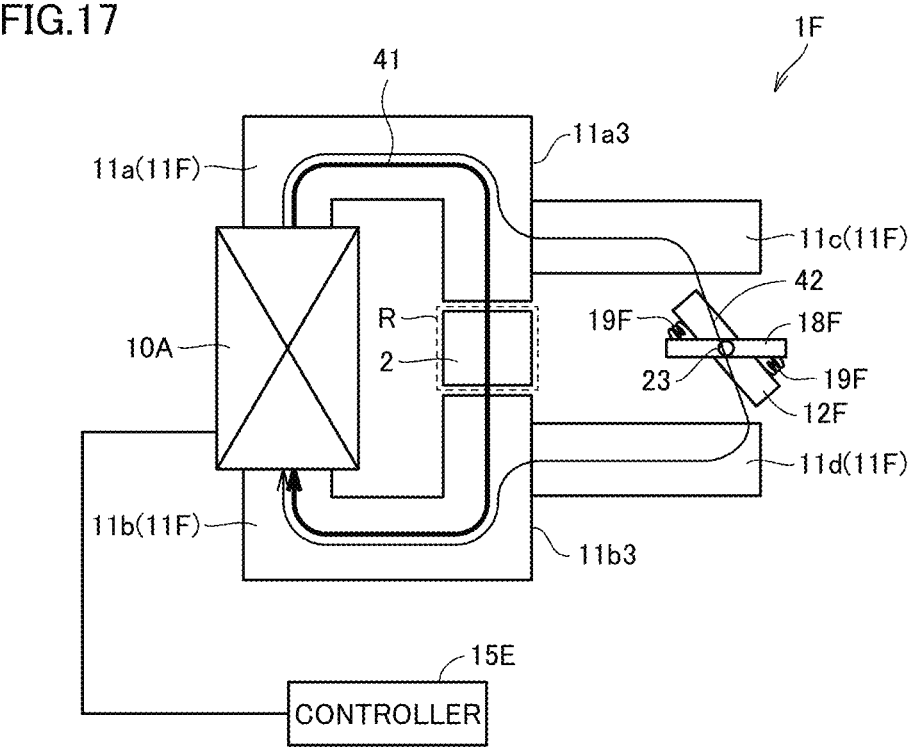
FIG. 17 is a view illustrating a configuration of a magnetic field application device according to a seventh embodiment when the intensity of the magnetic field in the magnetic field application region is increased.
Figure 18:
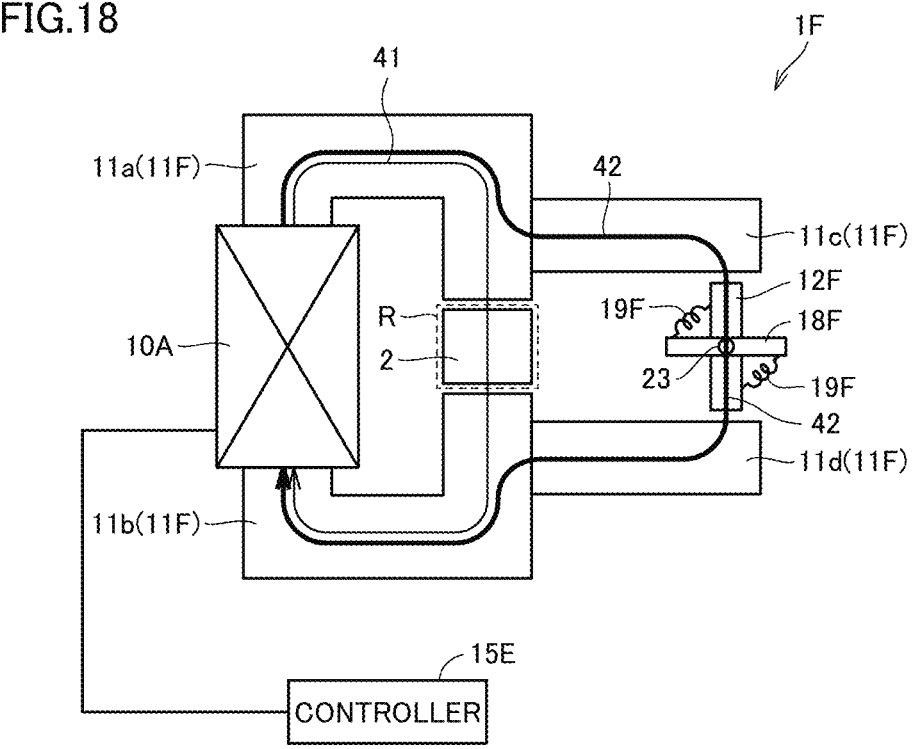
FIG. 18 is a view illustrating the configuration of the magnetic field application device of the seventh embodiment when the intensity of the magnetic field in the magnetic field application region is weakened.

FIG. 17 is a view illustrating a configuration of a magnetic field application device according to a seventh embodiment when the intensity of the magnetic field in the magnetic field application region is increased. FIG. 18 is a view illustrating the configuration of the magnetic field application device of the seventh embodiment when the intensity of the magnetic field in the magnetic field application region is weakened.

A magnetic field application device 1F of the seventh embodiment is different from magnetic field application device 1E of the sixth embodiment in that magnetic field application device 1F includes a first yoke 11F, a second yoke 12F, a fixing member 18F, and a pair of elastic bodies 19F instead of first yoke 11, second yoke 12, fixing member 18, and elastic body 19.

Similarly to first yoke 11, first yoke 11F includes yokes 11a, 11b. First yoke 11F further includes yokes 11c, 11d.

Yoke 11c is connected to side surface 11a3 of yoke 11a in the vicinity of magnetic field application region R. Yoke 11d is connected to side surface 11b3 of yoke 11b in the vicinity of magnetic field application region R. Yokes 11c, 11d have a plate shape and are opposite to each other.

Fixing member 18F has a plate shape, and is fixed between yokes 11c, 11d so as to be parallel to yokes 11c, 11d. The relative positional relationship between first yoke 11F and fixing member 18F is constant.

Second yoke 12F has a rectangular parallelepiped shape and is rotatably supported by fixing member 18F with a shaft 23 interposed therebetween. Second yoke 12F rotationally moves about shaft 23 between the first position and the second position. FIG. 17 illustrates the state when second yoke 12F is located at the first position. FIG. 18 illustrates the state when second yoke 12F is located at the second position.

For example, elastic body 19F is a coil spring, and is connected to fixing member 18F and the end of second yoke 12F. When second yoke 12F is located at the first position, elastic body 19F is attached with a natural length or slightly longer than the natural length.

Similarly to the embodiment E, controller 15E may control the magnetic field generating component 10A, which is the electromagnet, according to the control example in FIG. 16. Thus, in periods T21 to T23, second yoke 12F stagnates at the first position. In period T24, second yoke 12F rotationally moves to the second position according to the magnetic force with respect to first yoke 11F. Thus, the magnetic resistance of second closed magnetic circuit 42 formed by magnetic field generating component 10A, first yoke 11F, and second yoke 12F decreases, and the magnetic field generated by magnetic field generating component 10A tends to concentrate on second closed magnetic circuit 42. As a result, the magnetic field intensity of magnetic field application region R through which first closed magnetic circuit 41 formed by magnetic field generating component 10A and first yoke 11F passes is weakened.

As described above, second yoke 12F is rotationally moved from the first position to the second position using the magnetic force between first yoke 11F and second yoke 12F, so that the magnetic field intensity of magnetic field application region R can be varied at high speed.

Eighth Embodiment

Figure 19:
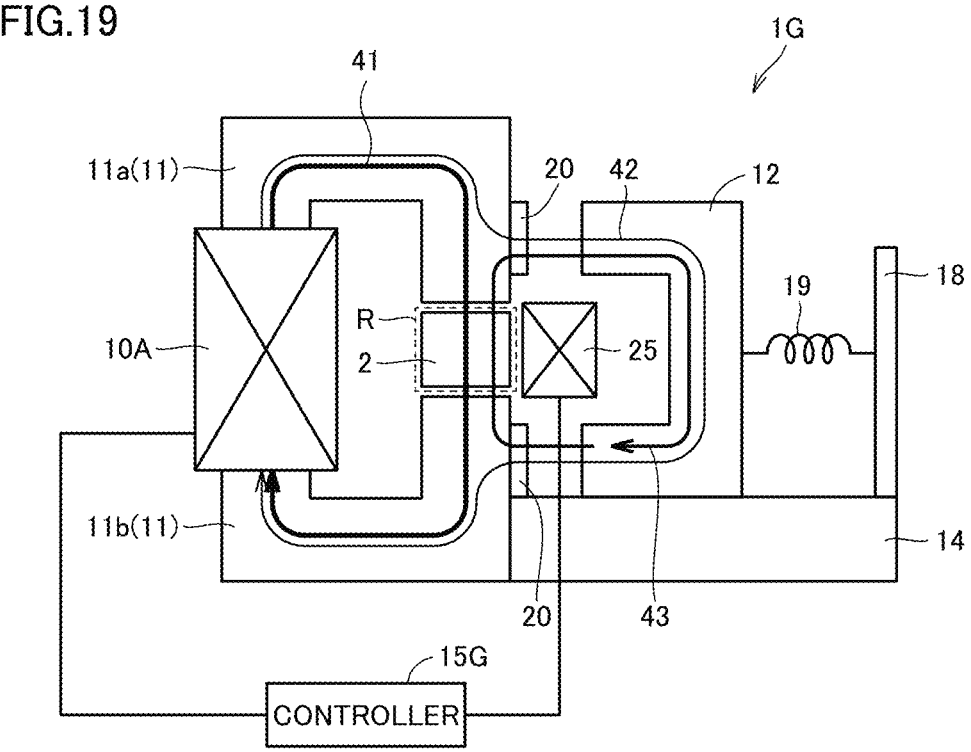
FIG. 19 is a view illustrating a configuration of a magnetic field application device according to an eighth embodiment when the intensity of the magnetic field in the magnetic field application region is increased.
Figure 20:
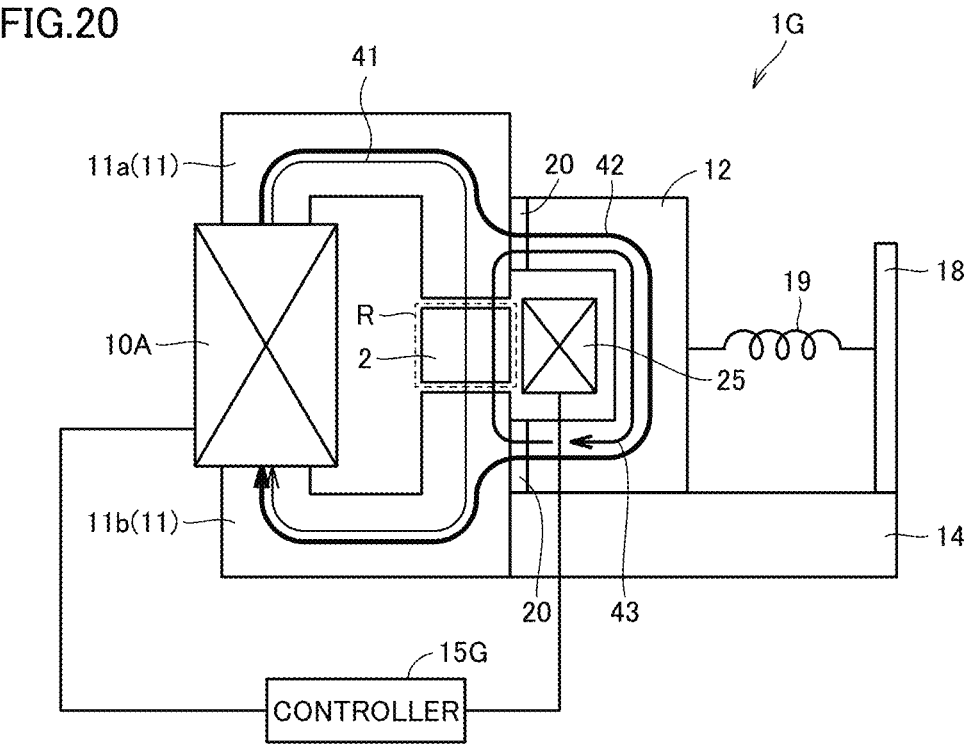
FIG. 20 is a view illustrating the configuration of the magnetic field application device of the eighth embodiment when the intensity of the magnetic field in the magnetic field application region is weakened.

FIG. 19 is a view illustrating a configuration of a magnetic field application device according to an eighth embodiment when the intensity of the magnetic field in the magnetic field application region is increased. FIG. 20 is a view illustrating the configuration of the magnetic field application device of the eighth embodiment when the intensity of the magnetic field in the magnetic field application region is weakened. Similarly to FIG. 14, FIG. 19 illustrates the state where second yoke 12 is located at the first position. Similarly to FIG. 15, FIG. 20 illustrates the state where second yoke 12 is located at the second position.

A magnetic field application device 1G of the eighth embodiment is different from magnetic field application device 1E of the sixth embodiment in that magnetic field application device 1G includes a controller 15G instead of controller 15E, and further includes a coil 25.

Coil 25 penetrates a space surrounded by first yoke 11 and second yoke 12. A return path (not illustrated) of coil 25 is located on the outer peripheries of first yoke 11 and second yoke 12.

Coil 25 may be wound around second yoke 12. However, when coil 25 is wound in close contact with second yoke 12, the weight of coil 25 makes it difficult for second yoke 12 to move. For this reason, coil 25 is preferably disposed at the fixed position so as to surround second yoke 12. Thus, second yoke 12 may translate inside a ring of coil 25. Thus, the weight of coil 25 does not hinder the movement of second yoke 12.

As illustrated in FIGS. 19 and 20, a third closed magnetic circuit 43 passing through first yoke 11 and second yoke 12 is formed by the current flowing through coil 25.

Controller 15G controls the magnetic force of magnetic field generating component 10A that is the electromagnet, and also controls the current flowing through coil 25. Furthermore, controller 15G controls the direction of the current flowing through coil 25 to either the forward direction or the backward direction. FIGS. 19 and 20 illustrate third closed magnetic circuit 43 when the forward current flows through coil 25.

Figure 21:
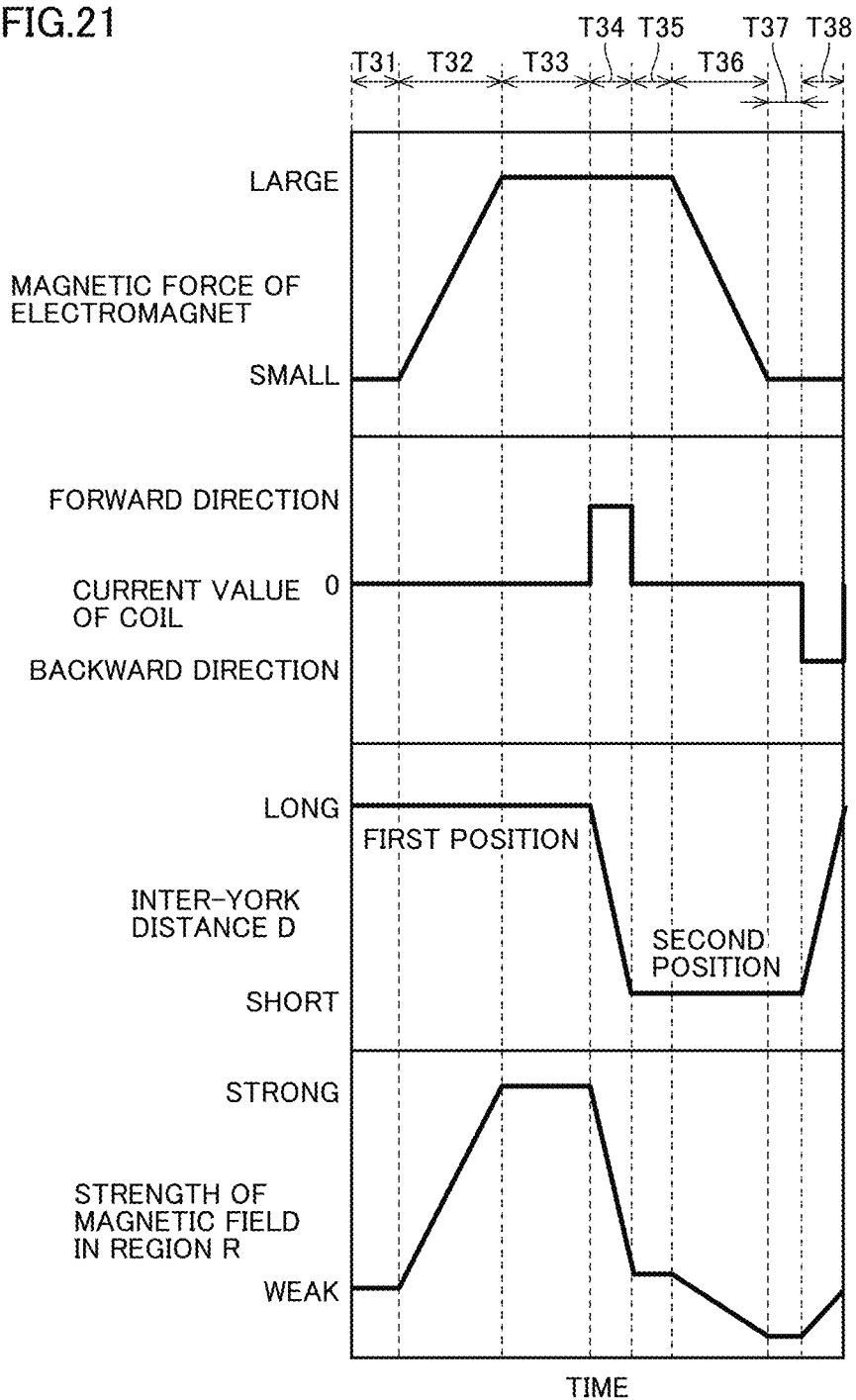
FIG. 21 is a view illustrating a control example of magnetic field intensity in the eighth embodiment.

FIG. 21 is a view illustrating a control example of the magnetic field intensity in the eighth embodiment. The first stage in FIG. 21 illustrates a graph indicting a temporal change in the magnetic force of magnetic field generating component 10 that is the electromagnet. The second stage in FIG. 21 illustrates a graph indicating a temporal change in the current value of coil 25. The third row in FIG. 21 illustrates a graph indicating a time change in distance D between first yoke 11 and second yoke 12. The fourth stage in FIG. 21 illustrates a graph indicating a temporal change in the magnetic field intensity of magnetic field application region R.

In a period T31, controller 15G sets the current value of magnetic field generating component 10A to the first specified value, and sets the current value of coil 25 to zero. For example, the first specified value is zero or a value slightly larger than zero. Thus, the excitation force of magnetic field generating component 10A is small. For this reason, the magnetic force between first yoke 11 and second yoke 12 is weak, and second yoke 12 is located at the first position according to the elastic force of elastic body 19. Furthermore, the magnetic field intensity of magnetic field application region R is weak.

In a period T32 subsequent to period T31, controller 15G increases the current value of magnetic field generating component 10A from the first specified value to the second specified value. Thus, the excitation force of magnetic field generating component 10A increases, and the magnetic field intensity of magnetic field application region R also increases. For example, the second specified value may be the maximum value of the current that can be energized to magnetic field generating component 10A.

In a period T33 subsequent to period T32, controller 15G maintains the current value of magnetic field generating component 10A at the second specified value. Thus, the magnetic field intensity of magnetic field application region R maintains a strong state.

In a period T34 subsequent to period T33, controller 15G performs control to cause the forward current to flow through coil 25 while maintaining the current value of magnetic field generating component 10A at the second specified value. Thus, third closed magnetic circuit 43 in the same direction as second closed magnetic circuit 42 is formed between first yoke 11 and second yoke 12. As a result, the magnetic force between first yoke 11 and second yoke 12 is increased. As described above, controller 15G increases the current flowing through coil 25, thereby increasing the magnetic force generated between first yoke 11 and second yoke 12. As the magnetic force increases, second yoke 12 moves from the first position to the second position. Thus, the intensity of the magnetic field in magnetic field application region R is weakened.

In a period T35 subsequent to period T34, controller 15G returns the current value of coil 25 to zero while maintaining the current value of magnetic field generating component 10A at the second specified value. Thus, third closed magnetic circuit 43 disappears. However, because distance D between first yoke 11 and second yoke 12 is short, the magnetic force between first yoke 11 and second yoke 12 is larger than that when second yoke 12 is located at the first position. As a result, second yoke 12 stagnates at the second position.

In a period T36 subsequent to period T35, controller 15G decreases the current value of magnetic field generating component 10A from the second specified value to the first specified value. Thus, the magnetic field intensity of magnetic field application region R is further weakened.

In a period T37 subsequent to period T36, controller 15G maintains the current value of magnetic field generating component 10A at the first specified value.

In a period T38 subsequent to period T37, controller 15G controls the current to flow in backward direction to the coil 25 while maintaining the current value of magnetic field generating component 10A at the first specified value. Thus, third closed magnetic circuit 43 in the direction opposite to second closed magnetic circuit 42 is formed between first yoke 11 and second yoke 12. As a result, the magnetic force between first yoke 11 and second yoke 12 is weakened. As the magnetic force is weakened, second yoke 12 moves from the second position to the first position according to the elastic force of elastic body 19. Thus, the magnetic field generated by magnetic field generating component 10A concentrates on first closed magnetic circuit 41. For this reason, the magnetic field intensity of magnetic field application region R slightly increases, and returns to the same state as the start time of period T11.

Controller 15G periodically repeats the operations in periods T31 to T38. Thus, the increase and decrease of the magnetic field intensity applied to the magnetocaloric material can be repeated, and magnetic refrigeration device 100 is implemented.

Third closed magnetic circuit 43 serves to assist the increase and decrease of the magnetic force between first yoke 11 and second yoke 12, the magnetic force being generated by second closed magnetic circuit 42. However, third closed magnetic circuit 43 also serves to hinder the increase and decrease of the magnetic field intensity of magnetic field application region R. Accordingly, the magnetic field intensity of magnetic field application region R is not maximum or minimum at the moment when the current is applied to coil 25 to assist the operation.

When the current of coil 25 is caused to flow in the backward direction in period T38, the directions of the magnetic force line of third closed magnetic circuit 43 are the same as the directions of the magnetic force line of first closed magnetic circuit 41 in magnetic field application region R. Consequently, third closed magnetic circuit 43 can be used to increase the magnetic field intensity of magnetic field application region R. However, in period T38, because second yoke 12 moves to the first position, the magnetic resistance of third closed magnetic circuit 43 increases, and the efficiency of enhancing the magnetic field intensity is poor.

Ninth Embodiment

Figure 22:
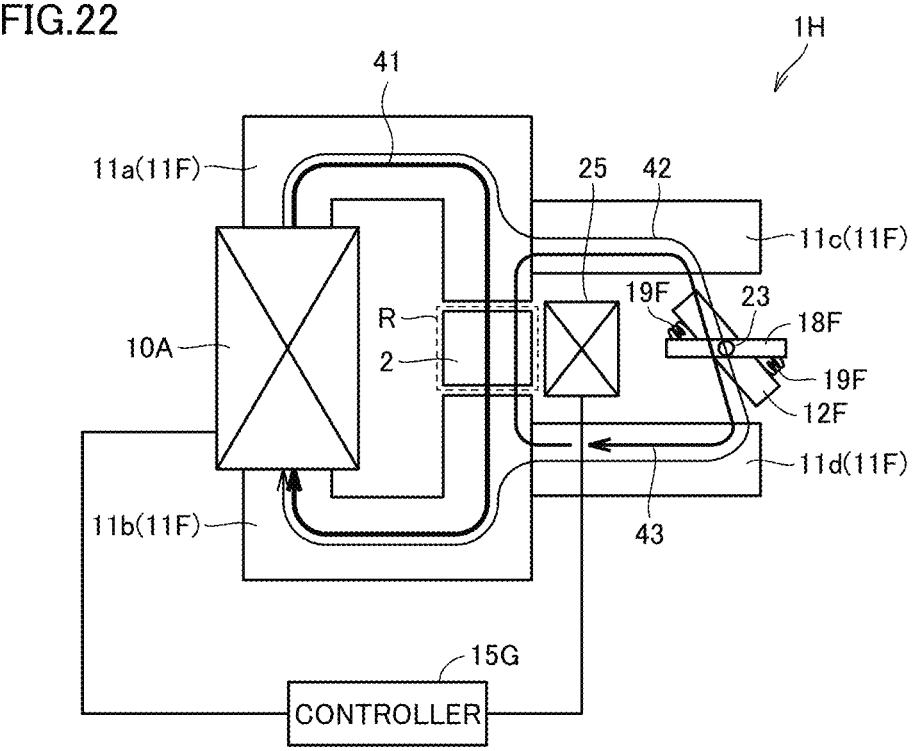
FIG. 22 is a view illustrating a configuration of a magnetic field application device according to a ninth embodiment when the intensity of the magnetic field in the magnetic field application region is increased.
Figure 23:
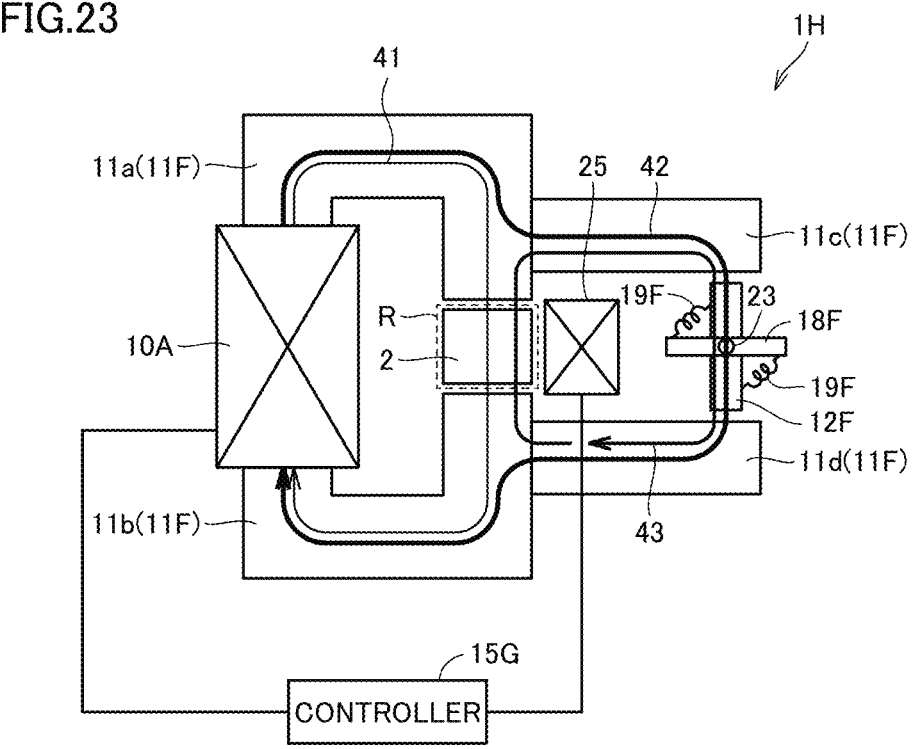
FIG. 23 is a view illustrating the configuration of the magnetic field application device of the ninth embodiment when the intensity of the magnetic field in the magnetic field application region is weakened.

FIG. 22 is a view illustrating a configuration of a magnetic field application device according to a ninth embodiment when the intensity of the magnetic field in the magnetic field application region is increased. FIG. 23 is a view illustrating the configuration of the magnetic field application device of the ninth embodiment when the intensity of the magnetic field in the magnetic field application region is weakened. Similarly to FIG. 17, FIG. 22 illustrates the state where second yoke 12F is located at the first position. Similarly to FIG. 18, FIG. 23 illustrates the state where second yoke 12F is located at the second position.

A magnetic field application device 1H of the ninth embodiment is different from magnetic field application device 1F of the seventh embodiment in that magnetic field application device 1H includes controller 15G instead of controller 15F, and further includes coil 25. The details of controller 15G and coil 25 are as described in the eighth embodiment.

Also in the ninth embodiment, controller 15G may perform control according to the control example in FIG. 21. Thus, the increase and decrease of the magnetic field intensity applied to the magnetocaloric material can be repeated, and magnetic refrigeration device 100 is implemented.

As described above, the magnetic field application devices (1, 1A to 1H) of the first to ninth embodiments include the magnetic field generating component (10, 10A), the first yoke (11, 11F) connected to both poles of the magnetic field generating component, and the second yoke (12, 12B, 12F) disposed to be movable between the first position and the second position. First closed magnetic circuit 41 formed by the magnetic field generating component and the first yoke passes through magnetic field application region R in which the magnetocaloric material is accommodated. Second closed magnetic circuit 42 formed by the magnetic field generating component, the first yoke, and the second yoke bypasses magnetic field application region R. The relative positional relationship among the magnetic field generating component, the first yoke, and magnetic field application region R is constant. The magnetic resistance of second closed magnetic circuit 42 when the second yoke is located at the second position is smaller than the magnetic resistance of second closed magnetic circuit 42 when the second yoke is located at the first position.

Thus, when the second yoke is moved between the first position and the second position, the density of the magnetic force line passing through magnetic field application region R among the magnetic force lines of the magnetic field generating component changes. That is, the magnetic field intensity of magnetic field application region R varies. Because the permeability of the gap between first yoke 11 and second yoke 12 is very small, the magnetic resistance of second closed magnetic circuit 42 greatly increases or decreases according to the movement of the second yoke. As a result, the magnetic field intensity of magnetic field application region R can be varied at high speed by the movement of the short distance of the second yoke. Furthermore, the magnetocaloric material is accommodated in magnetic field application region R, so that the uniform magnetic field can be applied to the magnetocaloric material. In this way, the intensity of the magnetic field applied to the magnetocaloric material can be varied uniformly and at high speed.

In the first to ninth embodiments, when the second yoke is located at the first position, the magnetic resistance of first closed magnetic circuit 41 is preferably smaller than the magnetic resistance of second closed magnetic circuit 42. Furthermore, when the second yoke is located at the second position, the magnetic resistance of second closed magnetic circuit 42 is preferably smaller than the magnetic resistance of first closed magnetic circuit 41. Thus, the variation amount of the magnetic field intensity in magnetic field application region R can be increased by the movement of the short distance of the second yoke.

As described above, the movement of the second yoke may be either the translational movement or the rotational movement. Specifically, in the first, second, fifth, sixth, and eighth embodiments, second yoke 12 translates between the first position and the second position. In the third, fourth, seventh, and ninth embodiments, second yokes 12B, 12F rotationally move between the first position and the second position.

The magnetic field application devices of the first to fourth embodiments further includes the moving mechanism to move the second yoke between the first position and the second position. The moving mechanisms of the first and second embodiments are actuator 13. The moving mechanisms of the third and fourth embodiments are motor 16 and shaft 17. When the moving mechanism is provided, the position control of the second yoke is facilitated.

In the magnetic field application devices of the fifth to ninth embodiments, the second yokes move from the first position to the second position by increasing the magnetic force generated between the second yoke and the first yoke. Thus, the moving mechanism can be omitted.

For example, in the magnetic field application devices of the fifth to seventh embodiments, magnetic field generating components 10A are the electromagnet. The magnetic field application devices further include the controllers (15D, 15E) to control the magnetic force of the electromagnet. The magnetic force generated between the first yoke and the second yoke is increased when the controller increases the magnetic force of the electromagnet.

In the magnetic field application device according to the fifth embodiment, controller 15D periodically changes the magnetic force of the electromagnet and the position of the second yoke in the order of the first state, the second state, the third state, the fourth state, and the fifth state. The first state corresponds to period T11 in FIG. 7, and is the state in which the magnetic force of the electromagnet has the first intensity and the second yoke is located at the first position. The second state corresponds to the end point of period T12 in FIG. 7, and is the state in which the magnetic force of the electromagnet has the second intensity larger than the first intensity and the second yoke is located at the first position. The third state corresponds to the end time point of period T14 in FIG. 7, and is the state in which the magnetic force of the electromagnet has the second intensity and the second yoke is located at the second position. The fourth state corresponds to the end time point of period T16 in FIG. 7, and is the state in which the magnetic force of the electromagnet has the first intensity and the second yoke is located at the second position.

In the magnetic field application devices of the sixth and seventh embodiments, controller 15E periodically changes the magnetic force of the electromagnet and the position of the second yoke in the order of the first state, the second state, the third state, the fourth state, and the fifth state. The first state corresponds to period T21 in FIG. 16, and is the state in which the magnetic force of the electromagnet has the first intensity and the second yoke is located at the first position. The second state corresponds to the end point of period T22 in FIG. 16, and is the state in which the magnetic force of the electromagnet has the second intensity larger than the first intensity and the second yoke is located at the first position. The third state corresponds to the end point of period T24 in FIG. 16, and the state in which the magnetic force of the electromagnet has the third intensity larger than the second intensity and the second yoke is located at the second position. The fourth state corresponds to the end time point of period T26 in FIG. 16, and is the state in which the magnetic force of the electromagnet has the first intensity and the second yoke is located at the second position. The fifth state corresponds to the end point of period T28 in FIG. 16, is the state in which the magnetic force of the electromagnet has the fourth intensity smaller than the first intensity and the second yoke is located at the first position.

The magnetic field application devices of the eighth and ninth embodiments further include coil 25 penetrating the region surrounded by the first yoke and the second yoke and controller 15G to control the current flowing through coil 25. Controller 15 increases the current flowing through coil 25, to increase the magnetic force generated between the first yoke and the second yoke. Thus, because coil 25 can be used to enhance the magnetic force generated between the first yoke and the second yoke, the control of the magnetic force of the electromagnet is simplified.

The magnetic field application devices of the fifth to ninth embodiment further include the fixing member (18, 18F) having the constant relative position with respect to the first yoke and the elastic body (19, 19F) connected to the second yoke and the fixing member. The elastic body applies the force toward the first position to the second yoke located at the second position. Thus, second yoke 12 can be easily moved from the second position to the first position using the force applied from elastic body 19.

The magnetic field application devices of the seventh and ninth embodiments further include shaft 23 to rotatably support second yoke 12F. Shaft 23 is fixed to fixing member 18F. This also allows second yoke 12F to be easily moved from the second position to the first position using the force applied from elastic body 19F.

It should be considered that the disclosed embodiments are an example in all respects and not restrictive. The scope of the present disclosure is defined by not the description of the embodiments, but the claims, and it is intended that all changes within the meaning and scope of the claims are included in the present invention.

REFERENCE SIGNS LIST 1, 1A to 1H: magnetic field application device, 2: magnetic heat bed, 3, 4: heat exchanger, 5: pump, 6: pipe, 10, 10A: magnetic field generating component, 11, 11F: first yoke, 11a3, 11b3, 12c, 12d: side surface, 11a to 11d: yoke, 11a1, 11a2, 11b1, 11b2, 12a, 12b: end face, 12, 12B, 12F: second yoke, 13: actuator, 14: base, 15, 15A to 15G: controller, 16: motor, 17, 23: shaft, 18, 18F: fixing member, 19, 19F: elastic body, 20: spacer, 21: movable claw, 25: coil, 41: first closed magnetic circuit, 42: second closed magnetic circuit, 43: third closed magnetic circuit, 100: magnetic refrigeration device, R: magnetic field application region

The invention claimed is:

1. A magnetic field application device applying a magnetic field to a magnetocaloric material, the magnetic field application device comprising:
a magnetic field generating component that is an electromagnet;
a first yoke connected to both poles of the magnetic field generating component;
a second yoke disposed movably between a first position and a second position; and
a controller to control magnetic force of the electromagnet,
wherein
a first closed magnetic circuit formed by the magnetic field generating component and the first yoke passes through a magnetic field application region in which the magnetocaloric material is accommodated,
a second closed magnetic circuit formed by the magnetic field generating component, the first yoke, and the second yoke bypasses the magnetic field application region and is larger than the first closed magnetic circuit,
a relative positional relationship among the magnetic field generating component, the first yoke, and the magnetic field application region is constant,
magnetic resistance of the second closed magnetic circuit when the second yoke is located at the second position is smaller than the magnetic resistance of the second closed magnetic circuit when the second yoke is located at the first position,
the second yoke moves from the first position to the second position by increasing magnetic force generated between the second yoke and the first yoke,
the magnetic force generated between the first yoke and the second yoke is increased when the controller increases the magnetic force of the electromagnet,
the controller periodically changes the magnetic force of the electromagnet and the position of the second yoke in order of a first state, a second state, a third state, and a fourth state,
the first state is a state in which the magnetic force of the electromagnet has first intensity and the second yoke is located at the first position,
the second state is a state in which the magnetic force of the electromagnet has second intensity larger than the first intensity and the second yoke is located at the first position,
the third state is a state in which the magnetic force of the electromagnet has the second intensity and the second yoke is located at the second position, and
the fourth state is a state in which the magnetic force of the electromagnet has the first intensity and the second yoke is located at the second position.

2. The magnetic field application device according to claim 1, wherein
the controller periodically changes the magnetic force of the electromagnet and the position of the second yoke in order of the first state, the second state, the third state, the fourth state, and a fifth state,
in the third state, the magnetic force of the electromagnet has third intensity larger than the second intensity instead of the second intensity, and the fifth state is a state in which the magnetic force of the electromagnet has fourth intensity smaller than the first intensity and the second yoke is located at the first position.

3. A magnetic field application device applying a magnetic field to a magnetocaloric material, the magnetic field application device comprising:
a magnetic field generating component;
a first yoke connected to both poles of the magnetic field generating component;
a second yoke disposed movably between a first position and a second position;
a coil penetrating a region surrounded by the first yoke, the second yoke and a magnetic field application region in which the magnetocaloric material is accommodated; and
a controller to control current flowing through the coil,
wherein
a first closed magnetic circuit formed by the magnetic field generating component and the first yoke passes through the magnetic field application region,
the first yoke includes two portions that are opposite to each other so as to interpose the magnetic field application region between the two portions,
a second closed magnetic circuit formed by the magnetic field generating component, the first yoke, and the second yoke bypasses the magnetic field application region by passing through a side surface of each of the two portions,
a relative positional relationship among the magnetic field generating component, the first yoke, and the magnetic field application region is constant,
magnetic resistance of the second closed magnetic circuit when the second yoke is located at the second position is smaller than the magnetic resistance of the second closed magnetic circuit when the second yoke is located at the first position,
the second yoke moves from the first position to the second position by increasing magnetic force generated between the second yoke and the first yoke,
the coil is disposed at a fixed position so as to have a constant relative position with respect to the first yoke, and
the controller increases the current flowing through the coil to increase the magnetic force generated between the first yoke and the second yoke.

4. A magnetic field application device applying a magnetic field to a magnetocaloric material, the magnetic field application device comprising:
a magnetic field generating component that is an electromagnet;
a first yoke connected to both poles of the magnetic field generating component;
a second yoke disposed movably between a first position and a second position;
a controller to control magnetic force of the electromagnet;
a fixing member having a constant relative position with respect to the first yoke; and
an elastic body connected to the second yoke and the fixing member,
wherein
a first closed magnetic circuit formed by the magnetic field generating component and the first yoke passes through a magnetic field application region in which the magnetocaloric material is accommodated,
a second closed magnetic circuit formed by the magnetic field generating component, the first yoke, and the second yoke bypasses the magnetic field application region and is larger than the first closed magnetic circuit,
a relative positional relationship among the magnetic field generating component, the first yoke, and the magnetic field application region is constant,
magnetic resistance of the second closed magnetic circuit when the second yoke is located at the second position is smaller than the magnetic resistance of the second closed magnetic circuit when the second yoke is located at the first position,
the second yoke moves from the first position to the second position by increasing magnetic force generated between the second yoke and the first yoke,
the magnetic force generated between the first yoke and the second yoke is increased when the controller increases the magnetic force of the electromagnet, and
the elastic body applies force toward the first position to the second yoke located at the second position.

5. The magnetic field application device according to claim 4, further comprising a shaft to rotatably support the second yoke,
wherein the shaft is fixed to the fixing member.

* * * * *